(12) United States Patent
Li et al.

(10) Patent No.: US 11,398,885 B2
(45) Date of Patent: Jul. 26, 2022

(54) SIGNAL TRANSMISSION METHOD AND APPARATUS

(71) Applicant: HUAWEI TECHNOLOGIES CO., LTD., Guangdong (CN)

(72) Inventors: Xinxian Li, Shanghai (CN); Hao Tang, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/116,632

(22) Filed: Dec. 9, 2020

(65) Prior Publication Data

US 2021/0119745 A1 Apr. 22, 2021

Related U.S. Application Data

(63) Continuation of application No. PCT/CN2019/090165, filed on Jun. 5, 2019.

(30) Foreign Application Priority Data

Jun. 15, 2018 (CN) .......................... 201810623140.2

(51) Int. Cl.
*H04L 5/00* (2006.01)
*H04W 72/04* (2009.01)
*H04W 72/08* (2009.01)

(52) U.S. Cl.
CPC ......... *H04L 5/0042* (2013.01); *H04W 72/048* (2013.01); *H04W 72/085* (2013.01)

(58) Field of Classification Search
CPC ..................... H04W 72/0453; H04L 5/0098
See application file for complete search history.

(56) References Cited

U.S. PATENT DOCUMENTS

2018/0098361 A1 4/2018 Ji et al.

FOREIGN PATENT DOCUMENTS

| CN | 110536422 A | 12/2019 |
| WO | 2018063944 A1 | 4/2018 |
| WO | WO-2019136587 A1 * | 7/2019 | ........... H04B 7/0602 |

OTHER PUBLICATIONS

Huawei, HiSilicon, "Bandwidth part activation and adaptation," 3GPP TSG RAN WG1 Meeting #90bis, R1-1717905, Prague, Czech Republic, Oct. 9-13, 2017, 7 pages.

(Continued)

*Primary Examiner* — Kevin Kim
(74) *Attorney, Agent, or Firm* — Fish & Richardson P.C.

(57) ABSTRACT

A signal transmission method and an apparatus are provided. The signal transmission method includes receiving a first message in an active first carrier bandwidth part BWP, and then determining, based on the first message, that a new active BWP of a terminal device is a second BWP, where the second BWP is a BWP in one or more to-be-activated BWPs of the terminal device, and then transmitting a signal in the second BWP. In embodiments of this application, the one or more to-be-activated BWPs is configured, where the to-be-activated BWP is a state configured by a network device for the terminal device. In addition to the first BWP in an active state, the second BWP in a to-be-activated state further exists at the same moment.

19 Claims, 8 Drawing Sheets

(56) References Cited

OTHER PUBLICATIONS

Office Action issued in Chinese Application No. 201810623140.2 dated Jun. 21, 2021, 4 pages.
Extended European Search Report issued in European Application No. 19818810.4 dated Jun. 1, 2021, 11 pages.
Huawei, HiSilicon, "Remaining issues on bandwidth part and wideband operation," 3GPP TSG RAN WG1 NR Ad Hoc Meeting, R1-1800018, Vancouver, Canada, Jan. 22-26, 2018, 14 pages.
3GPP TS 38.211 V15.1.0 (Mar. 2018), "3rd Generation Partnership Project; Technical Specification Group Radio Access Network; NR; Physical channels and modulation (Release 15)," Mar. 2018, 90 pages.
Convida Wireless, "Design Considerations for BWP in NR," 3GPP TSG-RAN WG1 Meeting #91, R1-1720930, Reno, USA, Nov. 27-Dec. 1, 2017, 5 pages.
Huawei et al., "Summary of remaining issues on bandwidth part and wideband operation," 3GPP TSG RAN WG1 Meeting #92, R1-1801347, Athens, Greece, Feb. 26-Mar. 2, 2018, 13 pages.
PCT International Search Report and Written Opinion issued in International Application No. PCT/CN2019/090165 dated Aug. 22, 2019, 11 pages (with English translation).
Samsung, "Multiple active bandwidth parts," 3GPP TSG-RAN WG2 NR #102 Meeting, R2-1808650, Busan, Korea, May 21-25, 2018, 2 pages.
Office Action in Chinese Application No. 201810623140.2, dated Apr. 20, 2021, 7 pages.

\* cited by examiner

SIGNAL TRANSMISSION METHOD AND APPARATUS

CROSS-REFERENCE TO RELATED APPLICATION

This application is a continuation of International Application No. PCT/CN2019/090165, filed on Jun. 5, 2019, which claims priority to Chinese Patent Application No. 201810623140.2, filed on Jun. 15, 2018. The disclosures of the aforementioned applications are hereby incorporated by reference in their entireties.

TECHNICAL FIELD

This application relates to the field of communications technologies, and in particular, to a signal transmission method and an apparatus.

BACKGROUND

In a 5th generation (5G) new radio (NR) system, data transmission between a base station and a terminal device in a two-step resource allocation manner is discussed and supported, to be specific, the base station indicates a carrier bandwidth part (BWP) to the terminal device and allocates a resource to the terminal device in the indicated carrier bandwidth part, and the base station and the terminal device may transmit data on the allocated resource.

The base station may configure a plurality of carrier bandwidth parts for the terminal device. If the terminal device needs to work in a carrier bandwidth part, the base station needs to activate the carrier bandwidth part. Currently, the base station activates only one carrier bandwidth part for the terminal device at a same moment, so that the base station and the terminal device transmit a signal with each other in the activated carrier bandwidth part. In this case, if the base station configures a plurality of carrier bandwidth parts for the terminal device, the terminal device may need to switch a working carrier bandwidth part in a working process. During switching, the terminal device and the base station need to perform deactivation operations in an original working carrier bandwidth part, and perform activation operations in a target carrier bandwidth part to which the terminal device is to switch. It is clear that these operations need to take a time resulting in a high latency.

SUMMARY

Embodiments of this application provide a signal transmission method and an apparatus, to reduce a latency generated when a terminal device switches a carrier bandwidth part.

According to a first aspect, a first signal transmission method is provided. The method includes: receiving a first message in an active first BWP; determining, based on the first message, that a new active BWP of a terminal device is a second BWP, where the second BWP is a BWP in one or more to-be-activated BWPs of the terminal device, and the terminal device is in a radio frequency enabled state for the one or more to-be-activated BWPs of the terminal device; and transmitting a signal in the second BWP.

Alternatively, the signal transmission method provided in the first aspect may be: receiving a first message in an active first BWP; determining, based on the first message, that a new active BWP of a terminal device is a second BWP, where the second BWP is a BWP in one or more to-be-activated BWPs of the terminal device, and the terminal device is in a radio frequency enabled state for the one or more to-be-activated BWPs of the terminal device; and switching from the first BWP to the second BWP, and transmitting a signal in the second BWP.

In this embodiment of this application, at a same moment, in addition to the first BWP being an active BWP, there may further be the second BWP being a to-be-activated BWP. In other words, in addition to the first BWP in an active state, the second BWP in a to-be-activated state further exists, and the terminal device is in the radio frequency enabled state for the to-be-activated BWP of the terminal device. When switching the carrier bandwidth part, the terminal device may switch to the to-be-activated BWP. For example, if the terminal device is in the radio frequency enabled state for the to-be-activated BWP, when switching from the active BWP to the to-be-activated BWP, the terminal device may only need to switch transmission of a signal from the active BWP to the to-be-activated BWP without any other configuration operation. Therefore, it may be considered that switching with an approximately zero latency can be implemented. It can be learned that according to the technical solution provided in this embodiment of this application, a latency of switching the carrier bandwidth part by the terminal device is reduced, and communication quality is improved.

In a possible implementation, the method further includes: receiving a second message, and determining the one or more to-be-activated BWPs of the terminal device based on the second message, where the one or more to-be-activated BWPs of the terminal device is a downlink BWP and/or an uplink BWP in one or more BWPs of the terminal device. Optionally, the one or more to-be-activated BWPs of the terminal device are at least two downlink BWPs and/or at least two uplink BWPs in BWPs of the terminal device.

The one or more to-be-activated BWPs of the terminal device, namely, one or more to-be-activated BWPs configured by a network device for the terminal device, may be determined by using the second message, so that the configuration of the terminal device can be determined, and the second BWP can be determined from the one or more to-be-activated BWPs.

In a possible implementation, one of the one or more to-be-activated BWPs of the terminal device is a BWP in one BWP group of the terminal device, and the BWP group may include $K_1$ uplink BWPs and $K_2$ downlink BWPs, where both $K_1$ and $K_2$ are positive integers.

When configuring the BWPs for the terminal device, the network device may further group the BWPs, and configure a BWP group for the terminal device. For example, a grouping manner is that each of at least one of groups obtained after the grouping includes at least one uplink BWP and at least one downlink BWP. For example, the network device may perform grouping based on a service type, and BWPs included in different BWP groups are applicable to different services, or the network device may have another grouping basis, and this is not specifically limited.

In a possible implementation, one BWP group of the terminal device includes at least one to-be-activated uplink BWP and at least one to-be-activated downlink BWP, the at least one to-be-activated uplink BWP and the at least one to-be-activated downlink BWP are included in the one or more to-be-activated BWPs of the terminal device, and the BWP group may include $K_1$ uplink BWPs and $K_4$ downlink BWPs, where both $K_3$ and $K_4$ are positive integers.

If the network device groups the BWPs, in addition to the grouping, the network device may further configure the one or more to-be-activated BWPs for the terminal device. Specifically, the network device may configure one or more to-be-activated BWPs for at least one BWP group. For example, one BWP group may include at least one to-be-activated uplink BWP and at least one to-be-activated downlink BWP. The to-be-activated BWP is a BWP in the to-be-activated state. The concept of "to-be-activated state" is proposed in the embodiments of this application. A BWP in the to-be-activated state may also be referred to as a to-be-activated BWP, and the to-be-activated BWP is a state configured by the network device for the terminal device. For example, the to-be-activated BWP may be understood as a BWP in which the terminal device may directly listen to downlink control information and/or send/receive a signal. When switching from an active BWP to a to-be-activated BWP, the terminal device may only need to switch transmission of a signal to the to-be-activated BWP. In this way, because only the signal transmission needs to be switched and no other configuration operation needs to be performed, a switching latency is very low, and even switching with an approximately zero latency can be implemented. Therefore, the latency of switching the BWP by the terminal device is reduced, and communication quality is improved.

In a possible implementation, one uplink BWP in the one or more to-be-activated BWPs of the terminal device is a BWP in one uplink BWP group of the terminal device, and the uplink BWP group may include $K_5$ uplink BWPs, where $K_5$ is a positive integer; and/or one downlink BWP in the one or more to-be-activated BWPs of the terminal device is a BWP in one downlink BWP group of the terminal device, and the downlink BWP group may include $K_6$ downlink BWPs, where $K_6$ is a positive integer.

This is another grouping manner. In this grouping manner, the network device may separately group an uplink BWP and a downlink BWP, and BWP groups obtained through the grouping include an uplink BWP group and/or a downlink BWP group, the uplink BWP group includes an uplink BWP, and the downlink BWP group includes a downlink BWP. In this case, the one or more to-be-activated BWPs configured by the network device for the terminal device may include an uplink BWP and/or a downlink BWP, and all of the one or more to-be-activated BWPs belong to corresponding BWP groups. In this case, if the network device configures a to-be-activated uplink BWP for the terminal device, the to-be-activated uplink BWP is an uplink BWP in an uplink BWP group configured by the network device for the terminal device, and the uplink BWP group may include at least one uplink BWP. If the network device configures a to-be-activated downlink BWP for the terminal device, the to-be-activated downlink BWP is a downlink BWP in a downlink BWP group configured by the network device for the terminal device, and the downlink BWP group may include at least one downlink BWP.

This specification provides two grouping manners used by the network device. In a specific application, the network device may use different grouping manners based on actual situations or protocol settings. This is not specifically limited.

In a possible implementation, one uplink BWP group of the terminal device includes at least one to-be-activated uplink BWP, the at least one to-be-activated uplink BWP is included in the one or more to-be-activated BWPs of the terminal device, and the uplink BWP group may include $K_7$ uplink BWPs, where $K_7$ is a positive integer; and/or one downlink BWP group of the terminal device includes at least one to-be-activated downlink BWP, the at least one to-be-activated downlink BWP is included in the one or more to-be-activated BWPs of the terminal device, and the downlink BWP group may include $K_8$ downlink BWPs, where $K_8$ is a positive integer.

Similarly, in this grouping manner, in addition to the grouping, the network device may further configure the one or more to-be-activated BWPs for the terminal device. Specifically, the network device may configure one or more to-be-activated BWPs for at least one BWP group. The at least one BWP group may be an uplink BWP group, may be a downlink BWP group, or may include an uplink BWP group and a downlink BWP group. For example, the network device may configure at least one to-be-activated uplink BWP for one uplink BWP group. For another example, the network device may configure at least one to-be-activated downlink BWP for one downlink BWP group. Specifically, this embodiment of this application imposes no limitation on a quantity of to-be-activated BWPs configured by the network device for one BWP group. The to-be-activated BWP is configured, so that the terminal device may choose to switch from the active BWP to the to-be-activated BWP during switching. In this process, the terminal device may only need to switch transmission of a signal to the to-be-activated BWP. In this way, because only the signal transmission needs to be switched, and no other configuration operation needs to be performed, a switching latency is very low, and even zero-latency switching can be implemented, so that the latency of switching the BWP by the terminal device is reduced, and communication quality is improved.

In a possible implementation, the method further includes: sending a capability message, where the capability message is used to indicate a quantity of active BWPs that can be supported by the terminal device, and/or is used to indicate a quantity of to-be-activated BWPs that can be supported by the terminal device.

As described above, the network device may configure the BWP for the terminal device. Optionally, the network device may configure the BWP for the terminal device based on capability information of the terminal device. For example, the capability message may be sent, so that the network device can obtain the capability message. The network device may obtain the capability information of the terminal device by using the capability message. For example, the capability information of the terminal device includes at least one of the quantity of active BWPs that can be supported by the terminal device and the quantity of to-be-activated BWPs that can be supported by the terminal device, and may certainly further include other capability information. The network device may determine, based on the capability information of the terminal device, at least one of a BWP configured for the terminal device, a BWP group configured for the terminal device, and a to-be-activated BWP configured for the terminal device, and may further determine other information configured for the terminal device. The network device configures the terminal device based on the capability information of the terminal device, so that the configuration can better satisfy an actual status of the terminal device.

In a possible implementation, wherein when the signal is transmitted in the second BWP, the first BWP is included in the one or more to-be-activated BWPs of the terminal device.

To be specific, after the terminal device switches the transmission of the signal to the second BWP, the terminal device may not need to deactivate the first BWP, but continues to keep the first BWP in the to-be-activated state. In this way, if the terminal device subsequently switches transmission of a signal to the first BWP again, the first BWP is still the to-be-activated BWP. In this case, the switching latency of switching from the active BWP to the to-be-activated BWP by the terminal device is very low, and even zero-latency switching can be implemented. Therefore, the latency of switching the BWP by the terminal device is reduced, and communication quality is improved.

In a possible implementation, the determining, based on the first message, a new active BWP of a terminal device includes: determining, based on a BWP indicator field in the first message, that the new active BWP of the terminal device is the second BWP, where a length of the BWP indicator field is determined based on a quantity of BWPs included in one BWP group of the terminal device and a quantity of BWP groups of the terminal device; and the quantity of BWPs included in the BWP group of the terminal device is greater than or equal to a quantity of BWPs included in another BWP group of the terminal device.

To be specific, the first message may include the BWP indicator field, and the BWP indicator field may be used to indicate the new active BWP of the terminal device. The new active BWP of the terminal device may be determined based on information included in the indicator field, which is a relatively clear indication manner. In addition, the length of the indicator field is also determined based on an actual configuration of the terminal device, so that a waste of resources in the first message is reduced, and resource utilization is further correspondingly improved.

According to a second aspect, a second signal transmission method is provided. The method includes: sending a first message in an active first BWP, where the first message indicates that a new active BWP of a terminal device is a second BWP, the second BWP is a BWP in one or more to-be-activated BWPs of the terminal device, and the terminal device is in a radio frequency enabled state for the one or more to-be-activated BWPs of the terminal device; and transmitting a signal in the second BWP.

In a possible implementation, the method further includes: sending a second message, where the second message is used to indicate the one or more to-be-activated BWPs of the terminal device, and the one or more to-be-activated BWPs of the terminal device are at least two downlink BWPs and/or at least two uplink BWPs in BWPs of the terminal device.

In a possible implementation, one of the one or more to-be-activated BWPs of the terminal device is a BWP in one BWP group of the terminal device, and the BWP group may include $K_1$ uplink BWPs and $K_2$ downlink BWPs, where both $K_1$ and $K_2$ are positive integers.

In a possible implementation, one BWP group of the terminal device includes at least one to-be-activated uplink BWP and at least one to-be-activated downlink BWP, the at least one to-be-activated uplink BWP and the at least one to-be-activated downlink BWP are included in the one or more to-be-activated BWPs of the terminal device, and the BWP group may include $K_3$ uplink BWPs and $K_4$ downlink BWPs, where both $K_3$ and $K_4$ are positive integers.

In a possible implementation, one uplink BWP in the one or more to-be-activated BWPs of the terminal device is a BWP in one uplink BWP group of the terminal device, and the uplink BWP group may include $K_5$ uplink BWPs, where $K_5$ is a positive integer; and/or one downlink BWP in the one or more to-be-activated BWPs of the terminal device is a BWP in one downlink BWP group of the terminal device, and the downlink BWP group may include $K_6$ downlink BWPs, where $K_6$ is a positive integer.

In a possible implementation, one uplink BWP group of the terminal device includes at least one to-be-activated uplink BWP, the at least one to-be-activated uplink BWP is included in the one or more to-be-activated BWPs of the terminal device, and the uplink BWP group may include $K_7$ uplink BWPs, where $K_7$ is a positive integer; and/or one downlink BWP group of the terminal device includes at least one to-be-activated downlink BWP, the at least one to-be-activated downlink BWP is included in the one or more to-be-activated BWPs of the terminal device, and the downlink BWP group may include $K_8$ downlink BWPs, where $K_8$ is a positive integer.

In a possible implementation, the method further includes: receiving a capability message, and determining, based on the capability message, a quantity of active BWPs that can be supported by the terminal device and/or a quantity of to-be-activated BWPs that can be supported by the terminal device.

In a possible implementation, that the first message indicates that a new active BWP of a terminal device is a second BWP includes: a BWP indicator field in the first message indicates that the new active BWP of the terminal device is the second BWP, where a length of the BWP indicator field is determined based on a quantity of BWPs included in one BWP group of the terminal device and a quantity of BWP groups of the terminal device; and the quantity of BWPs included in the BWP group of the terminal device is greater than or equal to a quantity of BWPs included in another BWP group of the terminal device.

According to a third aspect, a first communications apparatus is provided. The communications apparatus may be a terminal device, or may be an apparatus used in a terminal device. The communications apparatus may include a communications module and a processing module, and the modules may perform the method according to any one of the first aspect or the possible implementations of the first aspect. Details are as follows:

the communications module is configured to receive a first message in an active first BWP;

the processing module is configured to determine, based on the first message, that a new active BWP of a terminal device is a second BWP, where the second BWP is a BWP in one or more to-be-activated BWPs of the terminal device, and the terminal device is in a radio frequency enabled state for the one or more to-be-activated BWPs of the terminal device; and the communications module is further configured to transmit a signal in the second BWP.

Alternatively, when the communications module and the processing module included in the first communications apparatus provided in the third aspect perform the method according to any one of the first aspect or the possible implementations of the first aspect, details may be as follows:

the communications module is configured to receive a first message in an active first BWP:

the processing module is configured to determine, based on the first message, that a new active BWP of a terminal device is a second BWP, where the second BWP is a BWP in one or more to-be-activated BWPs of the terminal device, and the terminal device is in a radio frequency enabled state for the one or more to-be-activated BWPs of the terminal device; and is configured to switch from the first BWP to the second BWP; and the communications module is further configured to transmit a signal in the second BWP.

In a possible implementation, the communications module is further configured to receive a second message; and the processing module is further configured to determine the one or more to-be-activated BWPs of the terminal device based on the second message, where the one or more to-be-activated BWPs of the terminal device are at least two downlink BWPs and/or at least two uplink BWPs in BWPs of the terminal device.

In a possible implementation, for specific content of one of the one or more to-be-activated BWPs of the terminal device, refer to the specific descriptions of one of the one or more to-be-activated BWPs of the terminal device in the first aspect, and this is not specifically limited herein;

for specific content of one BWP group of the terminal device, refer to the specific descriptions of one BWP group of the terminal device in the first aspect, and this is not specifically limited herein;

for specific content of one uplink BWP of the one or more to-be-activated BWPs of the terminal device, refer to the specific descriptions of one uplink BWP of the one or more to-be-activated BWPs of the terminal device in the first aspect, and this is not specifically limited herein;

for specific content of one downlink BWP of the one or more to-be-activated BWPs of the terminal device, refer to the specific descriptions of one downlink BWP of the one or more to-be-activated BWPs of the terminal device in the first aspect, and this is not specifically limited herein:

for specific content of one uplink BWP group of the terminal device, refer to the specific descriptions of one uplink BWP group of the terminal device in the first aspect, and this is not specifically limited herein; and for specific content of one downlink BWP group of the terminal device, refer to the specific descriptions of one downlink BWP group of the terminal device in the first aspect, and this is not specifically limited herein.

In a possible implementation, the communications module is further configured to send a capability message, where the capability message is used to indicate a quantity of active BWPs that can be supported by the terminal device, and/or is used to indicate a quantity of to-be-activated BWPs that can be supported by the terminal device.

In a possible implementation, the processing module is further configured to: when transmitting a signal in the second BWP through the communications module, keep the first BWP included in the one or more to-be-activated BWPs of the terminal device.

In a possible implementation, the processing module is specifically configured to determine, based on a BWP indicator field in the first message, that the new active BWP of the terminal device is the second BWP, where a length of the BWP indicator field is determined based on a quantity of BWPs included in one BWP group of the terminal device and a quantity of BWP groups of the terminal device; and a quantity of BWPs included in the BWP group of the terminal device is greater than or equal to a quantity of BWPs included in another BWP group of the terminal device.

According to a fourth aspect, a second communications apparatus is provided. The communications apparatus may be a network device, or may be an apparatus used in a network device. The communications apparatus may include a communications module, and the module may perform the method according to any one of the second aspect or the possible implementations of the second aspect. Details are as follows:

the communications module is configured to send a first message in an active first BWP, where the first message indicates that a new active BWP of a terminal device is a second BWP, the second BWP is a BWP in one or more to-be-activated BWPs of the terminal device, and the terminal device is in a radio frequency enabled state for the one or more to-be-activated BWPs of the terminal device; and the communications module is configured to transmit a signal in the second BWP.

In a possible implementation, the communications module is further configured to send a second message, where the second message is used to indicate the one or more to-be-activated BWPs of the terminal device, and the one or more to-be-activated BWPs of the terminal device are at least two downlink BWPs and/or at least two uplink BWPs in BWPs of the terminal device.

In a possible implementation, for specific content of one of the one or more to-be-activated BWPs of the terminal device, refer to the specific descriptions of one of the one or more to-be-activated BWPs of the terminal device in the first aspect, and this is not specifically limited herein;

for specific content of one BWP group of the terminal device, refer to the specific descriptions of one BWP group of the terminal device in the first aspect, and this is not specifically limited herein;

for specific content of one uplink BWP of the one or more to-be-activated BWPs of the terminal device, refer to the specific descriptions of one uplink BWP of the one or more to-be-activated BWPs of the terminal device in the first aspect, and this is not specifically limited herein;

for specific content of one downlink BWP of the one or more to-be-activated BWPs of the terminal device, refer to the specific descriptions of one downlink BWP of the one or more to-be-activated BWPs of the terminal device in the first aspect, and this is not specifically limited herein;

for specific content of one uplink BWP group of the terminal device, refer to the specific descriptions of one uplink BWP group of the terminal device in the first aspect, and this is not specifically limited herein; and for specific content of one downlink BWP group of the terminal device, refer to the specific descriptions of one downlink BWP group of the terminal device in the first aspect, and this is not specifically limited herein.

In a possible implementation, the communications apparatus further includes a processing module, where the communications module is further configured to receive a capability message; and the processing module is configured to determine, based on the capability message, a quantity of active BWPs that can be supported by the terminal device and/or a quantity of to-be-activated BWPs that can be supported by the terminal device.

In a possible implementation, for that the first message indicates that anew active BWP of a terminal device is a second BWP, refer to the specific descriptions for that the first message indicates that a new active BWP of a terminal device is a second BWP in the first aspect. This is not specifically limited herein.

According to a fifth aspect, a third communications apparatus is provided. The communications apparatus includes a processor, configured to implement the method according to the first aspect. The communications apparatus may further include a memory, configured to store a program instruction and data. The memory is coupled to the processor. The processor may invoke and execute the program instruction stored in the memory, to implement the method according to the first aspect. The communications apparatus may further include a communications interface, and the communications interface is used by the communications apparatus to communicate with another device. For example, the communications interface is a transceiver. For example, the another device is a network device.

In a possible design, the communications apparatus includes:

a communications interface;

a memory, configured to store a program instruction; and a processor, configured to: receive a first message in an active first BWP through the communications interface; determine, based on the first message, that a new active BWP of a terminal device is a second BWP, where the second BWP is a BWP in one or more to-be-activated BWPs of the terminal device, and the terminal device is in a radio frequency enabled state for the one or more to-be-activated BWPs of the terminal device; and transmit a signal in the second BWP through the communications interface.

Alternatively, the third communications apparatus provided in the fifth aspect may include:

a communications interface;

a memory, configured to store a program instruction; and a processor, configured to: receive a first message in an active first BWP through the communications interface; determine, based on the first message, that a new active BWP of a terminal device is a second BWP, where the second BWP is a BWP in one or more to-be-activated BWPs of the terminal device, and the terminal device is in a radio frequency enabled state for the one or more to-be-activated BWPs of the terminal device; and switch from the first BWP to the second BWP, and transmit a signal in the second BWP through the communications interface.

In a possible implementation, the communications module is further configured to receive a second message; and the processor is further configured to determine the one or more to-be-activated BWPs of the terminal device based on the second message, where the one or more to-be-activated BWPs of the terminal device are at least two downlink BWPs and/or at least two uplink BWPs in BWPs of the terminal device.

In a possible implementation, for specific content of one of the one or more to-be-activated BWPs of the terminal device, refer to the specific descriptions of one of the one or more to-be-activated BWPs of the terminal device in the first aspect, and this is not specifically limited herein;

for specific content of one BWP group of the terminal device, refer to the specific descriptions of one BWP group of the terminal device in the first aspect, and this is not specifically limited herein:

for specific content of one uplink BWP of the one or more to-be-activated BWPs of the terminal device, refer to the specific descriptions of one uplink BWP of the one or more to-be-activated BWPs of the terminal device in the first aspect, and this is not specifically limited herein;

for specific content of one downlink BWP of the one or more to-be-activated BWPs of the terminal device, refer to the specific descriptions of one downlink BWP of the one or more to-be-activated BWPs of the terminal device in the first aspect, and this is not specifically limited herein;

for specific content of one uplink BWP group of the terminal device, refer to the specific descriptions of one uplink BWP group of the terminal device in the first aspect, and this is not specifically limited herein; and for specific content of one downlink BWP group of the terminal device, refer to the specific descriptions of one downlink BWP group of the terminal device in the first aspect, and this is not specifically limited herein.

In a possible implementation, the communications interface is further configured to send a capability message, where the capability message is used to indicate a quantity of active BWPs that can be supported by the terminal device, and/or is used to indicate a quantity of to-be-activated BWPs that can be supported by the terminal device.

In a possible implementation, the processor is further configured to: when transmitting a signal in the second BWP through the communications interface, keep the first BWP included in the one or more to-be-activated BWPs of the terminal device.

In a possible implementation, the processor is specifically configured to determine, based on a BWP indicator field in the first message, that the new active BWP of the terminal device is the second BWP, where a length of the BWP indicator field is determined based on a quantity of BWPs included in one BWP group of the terminal device and a quantity of BWP groups of the terminal device; and a quantity of BWPs included in the BWP group of the terminal device is greater than or equal to a quantity of BWPs included in another BWP group of the terminal device.

According to a sixth aspect, a fourth communications apparatus is provided. The communications apparatus includes a processor, configured to implement the method according to the second aspect. The communications apparatus may further include a memory, configured to store a program instruction and data. The memory is coupled to the processor. The processor may invoke and execute the program instruction stored in the memory, to implement the method described in the second aspect. The communications apparatus may further include a communications interface, and the communications interface is used by the communications apparatus to communicate with another device. For example, the communications interface is a transceiver. For example, the another device is a terminal device.

In a possible design, the communications apparatus includes:

a memory, configured to store a program instruction; and a processor, configured to: send a first message in an active first BWP through the communications interface, where the first message indicates that a new active BWP of a terminal device is a second BWP, the second BWP is a BWP in one or more to-be-activated BWPs of the terminal device, and the terminal device is in a radio frequency enabled state for the one or more to-be-activated BWPs of the terminal device; and transmit a signal in the second BWP through the communications interface.

In a possible implementation, the processor is further configured to send a second message through the communications interface, where the second message is used to indicate the one or more to-be-activated BWPs of the terminal device, and the one or more to-be-activated BWPs of the terminal device are at least two downlink BWPs and/or at least two uplink BWPs in BWPs of the terminal device.

In a possible implementation, for specific content of one of the one or more to-be-activated BWPs of the terminal device, refer to the specific descriptions of one of the one or more to-be-activated BWPs of the terminal device in the first aspect, and this is not specifically limited herein;

for specific content of one BWP group of the terminal device, refer to the specific descriptions of one BWP group of the terminal device in the first aspect, and this is not specifically limited herein:

for specific content of one uplink BWP of the one or more to-be-activated BWPs of the terminal device, refer to the specific descriptions of one uplink BWP of the one or more to-be-activated BWPs of the terminal device in the first aspect, and this is not specifically limited herein;

for specific content of one downlink BWP of the one or more to-be-activated BWPs of the terminal device, refer to the specific descriptions of one downlink BWP of the one or more to-be-activated BWPs of the terminal device in the first aspect, and this is not specifically limited herein:

for specific content of one uplink BWP group of the terminal device, refer to the specific descriptions of one uplink BWP group of the terminal device in the first aspect, and this is not specifically limited herein; and for specific content of one downlink BWP group of the terminal device, refer to the specific descriptions of one downlink BWP group of the terminal device in the first aspect, and this is not specifically limited herein.

In a possible implementation, the processor is further configured to: receive a capability message through the communications interface; and determine, based on the capability message, a quantity of active BWPs that can be supported by the terminal device and/or a quantity of to-be-activated BWPs that can be supported by the terminal device.

In a possible implementation, for that the first message indicates that a new active BWP of a terminal device is a second BWP, refer to the specific descriptions for that the first message indicates that a new active BWP of a terminal device is a second BWP in the first aspect. This is not specifically limited herein.

According to a seventh aspect, a computer-readable storage medium is provided. The computer-readable storage medium includes an instruction, and when the instruction is run on a computer, the computer is enabled to perform the method according to any one of the first aspect or the possible implementations of the first aspect.

According to an eighth aspect, a computer-readable storage medium is provided. The computer-readable storage medium includes an instruction, and when the instruction is run on a computer, the computer is enabled to perform the method according to any one of the second aspect or the possible implementations of the second aspect.

According to a ninth aspect, a chip system is provided. The chip system includes a processor, and may further include a memory, to implement the method according to any one of the first aspect or the possible implementations of the first aspect. The chip system may include a chip, or may include a chip and another discrete component.

According to a tenth aspect, a chip system is provided. The chip system includes a processor, and may further include a memory, to implement the method according to any one of the second aspect or the possible implementations of the second aspect. The chip system may include a chip, or may include a chip and another discrete component.

According to an eleventh aspect, a communications system is provided. The communications system includes the communications apparatus according to any one of the third aspect or the possible implementations of the third aspect, and the communications apparatus according to any one of the fourth aspect or the possible implementations of the fourth aspect.

According to a twelfth aspect, a communications system is provided. The communications system includes the communications apparatus according to any one of the fifth aspect or the possible implementations of the fifth aspect, and the communications apparatus according to any one of the sixth aspect or the possible implementations of the sixth aspect.

In the embodiments of this application, the to-be-activated BWP is set. At a same moment, in addition to the first BWP in the active state, the second BWP in the to-be-activated state further exists. It may be considered that the switching from the active BWP to the to-be-activated BWP by the terminal device can be implemented with an approximately zero latency, so that the latency of switching the carrier bandwidth part by the terminal device is reduced, and the communication quality is improved.

DESCRIPTION OF EMBODIMENTS

Figure 1:
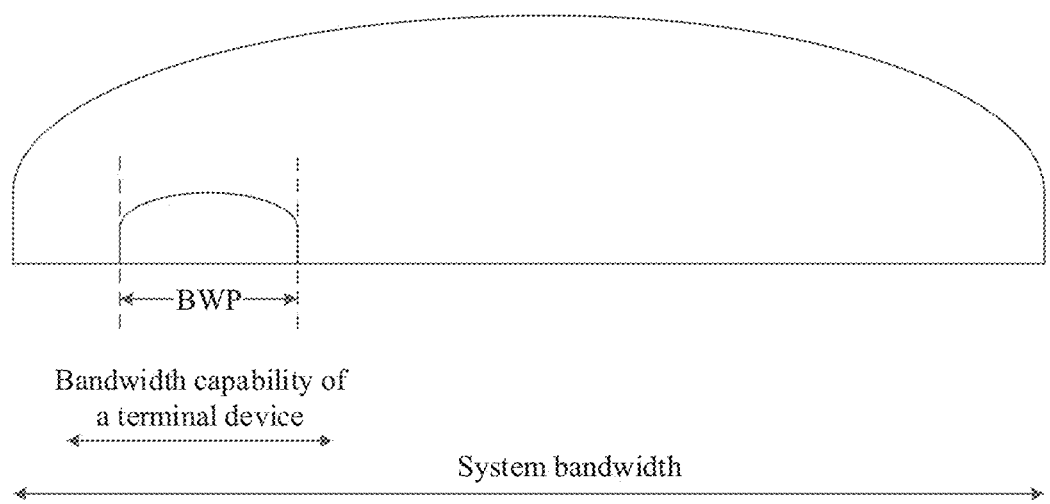
FIG. 1 is a schematic diagram in which a carrier bandwidth part allocated by a base station to a terminal device is less than a bandwidth capability of the terminal device.

To make objectives, technical solutions, and advantages of embodiments of this application clearer, the following further describes the embodiments of this application in detail with reference to the accompanying drawings.

In the following, some terms of the embodiments of this application are described, to help a person skilled in the art have a better understanding.

(1) A terminal device includes a device that provides a user with voice and/or data connectivity, for example, may include a handheld device having a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a subscriber unit, a subscriber station, a mobile station, a mobile, a remote station, an access point (AP), a remote terminal device, an access terminal device, a user terminal device, a user agent, a user device, or the like. For example, the terminal device may include a mobile phone (or referred to as a "cellular" phone), a computer having a mobile terminal device, a portable, pocket-sized, handheld, computer built-in, or in-vehicle mobile apparatus, or an intelligent wearable device. For example, the terminal device may include a device such as a personal communications service (PCS) phone, a cordless phone, a session initiation protocol (SIP) phone, a wireless local loop (WLL) station, or a personal digital assistant (PDA). The terminal device further includes a limited device, for example, a device with relatively low power consumption, a device with a limited storage capability, or a device with a limited computing capability. For example, the terminal device includes an information sensing device such as a bar code device, a radio frequency identification (RFID) device, a sensor, a global positioning system (GPS), or a laser scanner.

By way of example, and not limitation, the terminal device in the embodiments of this application may alternatively be a wearable device. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that is directly worn on the body or that is integrated into clothes or an accessory of a user. The wearable device is not merely a hardware device, but is configured to implement a powerful function through software support, data exchange, and cloud interaction. Generalized wearable intelligent devices include full-featured and large-size devices, such as smart watches or smart glasses, that can implement complete or partial functions without depending on smartphones; and devices, such as various smart bands, smart helmets, or smart jewelry for monitoring physical signs, that focus on only one type of application function and need to work with other devices such as smartphones.

(2) A network device, for example, including a base station (for example, an access point), may be a device that is in an access network and that communicates with a wireless terminal device over an air interface through one or more cells. The network device may be configured to: mutually convert a received over-the-air frame and an internet protocol (IP) packet, and serve as a router between the terminal device and a remaining portion of the access network, where the remaining portion of the access network may include an IP network. The network device may further coordinate air interface attribute management. For example, the network device may include an evolved NodeB (NodeB, eNB, or e-NodeB, evolved NodeB) in a long term evolution (LTE) system or an LTE advanced (LTE-A) system, or may include a next generation NodeB (gNB) in a 5th generation (5G) new radio (NR) system, or may include a centralized unit (CU) and a distributed unit (DU) in a cloud access network (CloudRAN) system. This is not limited in the embodiments of this application.

(3) A carrier bandwidth part may be a segment of consecutive resources in frequency domain, and the carrier bandwidth part may also be referred to as a bandwidth part (BWP or BP), a subband, a subband bandwidth, a narrowband, or a narrowband bandwidth, or may have another name. The name of the carrier bandwidth part is not limited in the embodiments of this application. For brevity, in this specification, an example in which the name is a BWP is used. For example, one BWP includes K (K>0) consecutive subcarriers; or one BWP is a frequency domain resource in which N non-overlapping consecutive resource blocks (RB) are located, where a subcarrier spacing of the RB may be 15 kHz, 30 kHz, 60 kHz, 120 kHz, 240 kHz, 480 kHz, or another value; or one BWP is a frequency domain resource in which M non-overlapping consecutive resource block groups (RBG) are located, where one RBG includes P (P>0) consecutive RBs, and a subcarrier spacing (SCS) of the RB may be 15 kHz, 30 kHz, 60 kHz, 120 kHz, 240 kHz, 480 kHz, or another value, for example, an integer multiple of 2. One bandwidth part is related to one specific system parameter (numerology), and the system parameter includes a subcarrier spacing, a cyclic prefix (CP), or a subcarrier spacing and a CP. Further, the carrier bandwidth part may alternatively be a plurality of segments of resources inconsecutive in frequency domain.

For example, the carrier bandwidth part in this specification may be a downlink carrier bandwidth part, and is used by a terminal device to perform downlink receiving. In this case, a bandwidth of the carrier bandwidth part does not exceed a receive bandwidth capability of the terminal device. Alternatively, the carrier bandwidth part may be an uplink carrier bandwidth part, and is used by a terminal device to perform uplink sending. In this case, a bandwidth of the carrier bandwidth part does not exceed a transmit bandwidth capability of the terminal device.

The carrier bandwidth part is a self-contained structure. For example, the terminal device does not expect to perform downlink receiving on a bandwidth other than the downlink carrier bandwidth part, and does not expect to perform uplink sending on an uplink bandwidth other than the uplink carrier bandwidth part.

(4) A "system parameter (numerology)" described in the embodiments of this application is a parameter used in a communications system, and may be a series of physical layer parameters in an air interface. The communications system (for example, a 5G system) may support a plurality of numerologies. During specific implementation, optionally, one BWP may correspond to one numerology. The numerology may include one or more of the following parameter information, a subcarrier spacing, information about a CP, information about a time unit, a bandwidth, and the like. For example, the numerology may include a subcarrier spacing and a CP.

A subcarrier spacing is used as an example. If a terminal device supports a subcarrier spacing of 15 kHz (kilohertz, kHz) and a subcarrier spacing of 30 kHz, a base station may allocate a BWP having a subcarrier spacing of 15 kHz and a BWP having a subcarrier spacing of 30 kHz to the terminal device. The terminal device may switch to different BWPs to transmit data based on different scenarios and service requirements. When the terminal device supports a plurality of BWPs, numerologies corresponding to different BWPs may be the same or may be different.

The subcarrier spacing may be an integer greater than or equal to 0. For example, the subcarrier spacing may be 15 kHz, 30 kHz, 60 kHz, 120 kHz, 240 kHz, or 480 kHz. For example, different subcarrier spacings may be integer multiples of 2. It may be understood that the subcarrier spacing may alternatively be designed to be another value. The subcarrier spacing is a value of a spacing between center locations or peak locations of two adjacent subcarriers in frequency domain in an orthogonal frequency division multiplexing (OFDM) system. For example, a subcarrier spacing in an LTE system is 15 kHz, and a subcarrier spacing in an NR system may be 15 kHz, 30 kHz, 60 kHz, 120 kHz, or the like.

For the subcarrier spacing, refer to the following Table 1:

TABLE 1

| $\mu$ | $\Delta f = 2^\mu \cdot 15$ [kHz] | CP type |
|---|---|---|
| 0 | 15 | Normal |
| 1 | 30 | Normal |
| 2 | 60 | Normal, and extended |
| 3 | 120 | Normal |
| 4 | 240 | Normal |

$\mu$ is used to indicate the subcarrier spacing. For example, when $\mu=0$, the subcarrier spacing is 15 kHz; or when $\mu=1$, the subcarrier spacing is 30 kHz.

The information about the CP may include a length of the CP and/or a type of the CP. For example, the CP may be a normal CP (NCP) or an extended CP (ECP).

The time unit is used to indicate a time unit in time domain. For example, the time unit may be a sampling point, a symbol, a mini-slot, a slot, a subframe, or a radio frame. The information about the time unit may include a type, a length, a structure, or the like of the time unit.

(5) The terms "system" and "network" may be interchangeably used in the embodiments of this application. "A plurality of" means two or more than two. In view of this, "a plurality of" may also be understood as "at least two" in the embodiments of this application. "At least one" may be understood as one or more, for example, understood as one, two, or more. For example, including at least one means including one, two, or more, and a quantity of objects that are included is not limited. For example, if at least one of A, B, and C is included, A, B, and C; A and B; A and C; B and C; or A, B, and C may be included. Alternatively, configuring at least one means configuring one, two, or more. For example, configuring at least one BWP may be understood as configuring one BWP, configuring two BWPs, or configuring more BWPs. Similarly, understanding of descriptions such as "at least one type" is similar to the foregoing understanding of "at least one". The term "and/or" describes an association relationship between associated objects and represents that three relationships may exist. For example, A and/or B may represent the following three cases. Only A exists, both A and B exist, and only B exists. In addition, unless otherwise specified, the character "/" generally indicates an "or" relationship between the associated objects.

Unless otherwise stated, in the embodiments of this application, ordinal numbers such as "first" and "second" are used to distinguish between a plurality of objects, and not intended to limit an order, a time sequence, a priority, or importance of the plurality of objects.

First, technical features in the embodiments of this application are described.

In an NR system, data transmission between a base station and a terminal device in a two-step resource allocation manner is discussed and supported, to be specific, the base station first indicates a BWP to the terminal device, allocates a resource to the terminal device in the indicated carrier bandwidth part, and transmit data.

For example, that the base station allocates a carrier bandwidth part to the terminal device includes but is not limited to being applied to at least one of the following three scenarios:

Scenario 1: High-bandwidth scenario

In a communications system, as a service volume of a terminal device increases and a quantity of terminal devices increases, a service volume of the system significantly increases. Therefore, in an existing communications system, a design in which a system bandwidth is a high bandwidth is proposed, to provide a relatively large quantity of system resources, so that a relatively high data transmission rate can be provided. In a communications system in which a system bandwidth is high, in consideration of costs of a terminal device and a service volume of the terminal device, a bandwidth supported by the terminal device may be less than the system bandwidth. A higher bandwidth supported by the terminal device indicates a stronger processing capability of the terminal device, may indicate a higher data transmission rate of the terminal device, and may further indicate higher design costs of the terminal device. The bandwidth supported by the terminal device may also be referred to as a bandwidth capability of the terminal device. If the terminal device is UE, the bandwidth supported by the terminal device may also be referred to as a bandwidth capability of the UE or a UE bandwidth capability. For example, in a 5G system, a maximum system bandwidth may be 400 MHz, and a bandwidth capability of a terminal device may be 20 MHz, 50 MHz, 100 MHz or the like. In a wireless communications system, bandwidth capabilities of different terminal devices may be the same or different. This is not limited in the embodiments of this application.

In the communications system in which the system bandwidth is high, because the bandwidth capability of the terminal device is less than the system bandwidth, a base station may configure a carrier bandwidth part for the terminal device from a system frequency resource, and a bandwidth of the carrier bandwidth part may be less than or equal to the bandwidth capability of the terminal device. For example, referring to FIG. 1, it can be learned that a system bandwidth is greater than a bandwidth capability of a terminal device, and a carrier bandwidth part configured by a base station for the terminal device is less than the bandwidth capability of the terminal device. When the terminal device and the base station communicate with each other, the base station may allocate, to the terminal device, some or all resources in the carrier bandwidth part configured for the terminal device. The resources are used for communication between the base station and the terminal device.

Scenario 2: Multi-numerology scenario.

In a wireless communications system, for example, in a 5G system to support more service types and/or communication scenarios, a design in which a plurality of numerologies are supported is proposed. For different service types and/or communication scenarios, numerologies may be independently set. In the embodiments of this application, setting performed by a network device may also be understood as configuration.

Figure 2:
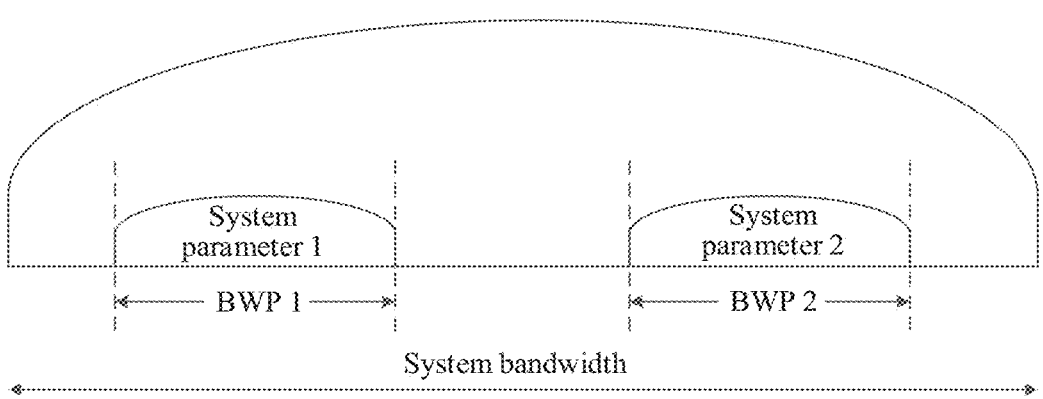
FIG. 2 is a schematic diagram in which a base station allocates two carrier bandwidth parts to a terminal device in a system bandwidth.

In a possible configuration, a base station may configure a plurality of carrier bandwidth parts on a system frequency resource, and independently configure a numerology for each of the plurality of carrier bandwidth parts, to support a plurality of service types and/or communication scenarios on the system frequency resource. Numerologies of different carrier bandwidth parts may be the same or may be different. For example, referring to FIG. 2, in a system bandwidth, a base station configures, for a terminal device, two carrier bandwidth parts, which are respectively a BWP 1 and a BWP 2. A numerology of the BWP 1 is a numerology 1, and a numerology of the BWP 2 is a numerology 2.

When UE and a base station communicates with each other, the base station may determine, based on a service type and/or a communication scenario that correspond/corresponds to the communication, a numerology A used for the communication, to configure a corresponding carrier bandwidth part for the UE based on the numerology A. A numerology of the corresponding carrier bandwidth part is configured as the numerology A. When the UE and the base station communicate with each other, the base station may allocate, to the UE for the communication between the base station and the UE, some or all resources in the carrier bandwidth part configured for the UE.

Scenario 3: Bandwidth fallback

Figure 3:
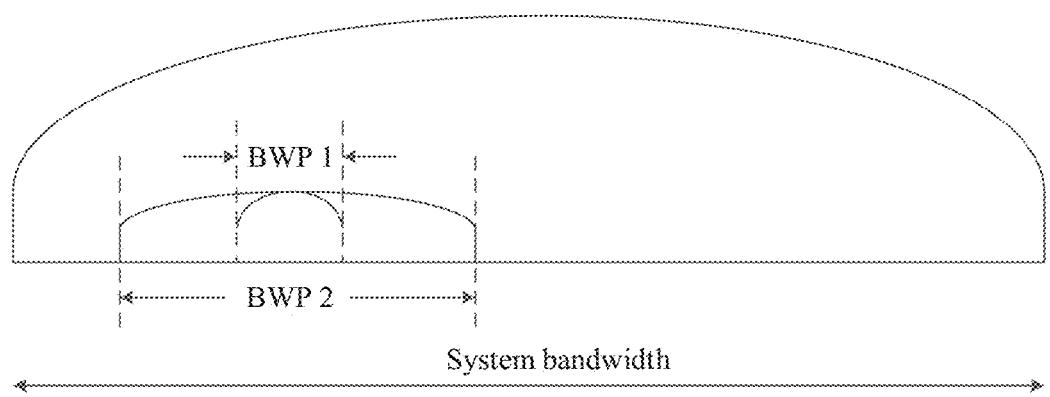
FIG. 3 is a schematic diagram in which a base station allocates different carrier bandwidth parts to a terminal device based on services of the terminal device.

When a terminal device and a base station communicate with each other, the base station may configure a carrier bandwidth part for the terminal device based on a service volume of the terminal device, to reduce power consumption of the terminal device. For example, if the terminal device has no service, the terminal device may be configured to receive control information only in a relatively small carrier bandwidth part. For example, the terminal device is configured to receive the control information in a BWP 1 shown in FIG. 3, so that radio frequency processing workload and baseband processing workload of the terminal device are reduced, thereby reducing the power consumption of the terminal device. If the terminal device has a relatively small service volume, the base station may configure a carrier bandwidth part having a relatively small bandwidth for the terminal device. For example, the base station configures the terminal device to transmit a service in the BWP 1 shown in FIG. 3, so that radio frequency processing workload and baseband processing workload of the terminal device can be reduced, thereby reducing the power consumption of the terminal device. However, if the terminal device has a relatively large service volume, the base station may configure a carrier bandwidth part having a relatively large bandwidth for the terminal device. For example, the base station configures the terminal device to transmit a service in a BWP 2 shown in FIG. 3, so that a higher data transmission rate can be provided. When the terminal device and the base station communicate with each other, the base station may allocate, to the terminal device, some or all resources in the carrier bandwidth part configured for the terminal device. The resources are used for communication between the base station and the terminal device.

In all of the foregoing three scenarios, the base station may allocate the carrier bandwidth part to the terminal device. The following describes how the base station configures one carrier bandwidth part for the terminal device.

The configuration of the carrier bandwidth part includes configuring a start resource block (RB) in frequency domain, a bandwidth (BW), and a corresponding system parameter (numerology) of the carrier bandwidth part. The bandwidth may be a quantity of RBs included in the carrier bandwidth part, and the system parameter includes, for example, a subcarrier spacing, a CP, or a subcarrier spacing and a CP.

Figure 4:
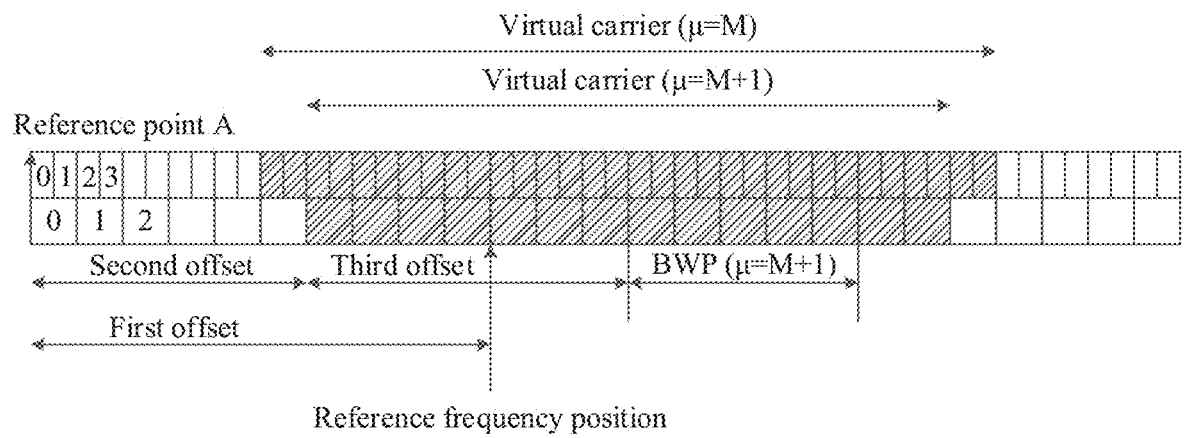
FIG. 4 is a schematic diagram in which a base station configures a carrier bandwidth part for a terminal device.

In an NR system, the base station may send a first offset, a second offset, and a third offset to the terminal device, to configure one carrier bandwidth part for the terminal device by using the three offsets (offset):

First offset (offset 1): The terminal device determines a reference point A based on a reference frequency position (reference point) configured by the base station and the first offset relative to the reference frequency position, and determines an index of a common resource block (RB) based on the reference point A. For the reference frequency position, the first offset, and a position of the reference point A, refer to FIG. 4. FIG. 4 shows an example of BWPs for which two different subcarrier spacings are configured, the upper row is one subcarrier spacing, for example, $\mu$=M, and the lower row is the other subcarrier spacing, for example, $\mu$=M+1. Different subcarrier spacings have sizes of $2\mu \times 15$ kHz and correspond to indexes of different common RBs. and all subcarriers 0 of common RBs 0 of common RBs corresponding to the different subcarrier spacings correspond to or include the reference point A. The common RBs are numbered from the common RB 0 in ascending order of frequencies. After the reference point A is determined, it may be determined that a subcarrier in which the reference point A is located is the subcarrier 0 of the common RB 0 of the common RBs.

Second offset (offset 2): The terminal device determines, based on the reference point A or the common RB 0 and the second offset relative to the reference point A or the common RB 0, a position of a lowest RB included in the virtual carrier. For the second offset, refer to FIG. 4, and a position of the virtual carrier is shown by a block drawn with oblique lines in FIG. 4.

Third offset (offset 3): The terminal device determines a position of a lowest RB and a position of a highest RB in the configured BWP based on a size of the configured BWP and an offset (namely, the third offset) between the position of the lowest RB in the configured BWP and the position of the lowest RB in the virtual carrier, for example, a position of the BWP shown in FIG. 4. FIG. 4 shows only the position of the configured BWP with $\mu$=M+1. A size of the configured BWP is sent by the base station to the terminal device.

In a possible design, in addition to configuring the carrier bandwidth part, a signal needs to be transmitted in the carrier bandwidth part, and the carrier bandwidth part further needs to be activated. Currently, the base station may configure a plurality of carrier bandwidth parts for the terminal device. However, the base station activates only one of the plurality of carrier bandwidth parts for the terminal device at a same moment, so that the base station and the terminal device transmit a signal with each other in the activated carrier bandwidth part. One carrier bandwidth part herein may be understood as one uplink carrier bandwidth part and one downlink carrier bandwidth part. In other words, the base station activates only one uplink carrier bandwidth part and one downlink carrier bandwidth part for the terminal device at a same moment. For example, in a process in which the terminal device performs random access, the base station may configure, for the terminal device, a carrier bandwidth part for initial access, activate the carrier bandwidth part, and keep the carrier bandwidth part in an active state. After the random access process of the terminal device is completed, the base station configures one or more carrier bandwidth parts for the terminal device by using a radio resource control (RRC) message, and the base station may switch between different carrier bandwidth parts by using an RRC message or downlink control information (DCI), to be specific, activate a new carrier bandwidth part, and deactivate an old carrier bandwidth part. A switching method is that an index of a target active carrier bandwidth part is carried in an RRC message or DCI, to enable the terminal device to switch to the target active carrier bandwidth part. When the terminal device switches from an original working carrier bandwidth part to a target carrier bandwidth part, the terminal device performs a deactivation operation on the original working carrier bandwidth part, and performs an activation operation on the target carrier bandwidth part to which the terminal device is to switch. These operations need to take a time, and the time is used to change a center and/or a size of a radio frequency, resulting in a relatively high switching latency.

In view of this, it is proposed in the embodiments of this application that at a same moment, in addition to a first BWP being an active BWP, there may further be a second BWP being a to-be-activated BWP. In other words, in addition to the first BWP in an active state, the second BWP in a to-be-activated state further exists, so that a latency of switching a carrier bandwidth part by the terminal device is reduced, and communication quality is improved.

The technical solutions provided in the embodiments of this application may be used in (but not limited to) a communications system having a plurality of subcarrier spacings, for example, an NR system; or may be used in a next-generation communications system or another similar communications system.

In the technical solutions in the embodiments of this application, a future service requirement may be considered. In the future, one terminal device may need a plurality of to-be-activated BWPs simultaneously, and simultaneously transmit a signal in one or more of the BWPs; in this case, that the base station is to activate only one BWP at a moment cannot satisfy the requirement. For example, that the base station is to activate a plurality of carrier bandwidth parts for the terminal device includes but is not limited to being applied to at least one of the following three scenarios. In other words, the following three scenarios are several possible application scenarios of the embodiments of this application.

Scenario 1: In a vehicle to everything (V2X) scenario, both an enhanced mobile broadband (eMBB) service and an ultra-reliable low-latency communication (URLLC) service are transmitted.

Figure 5:
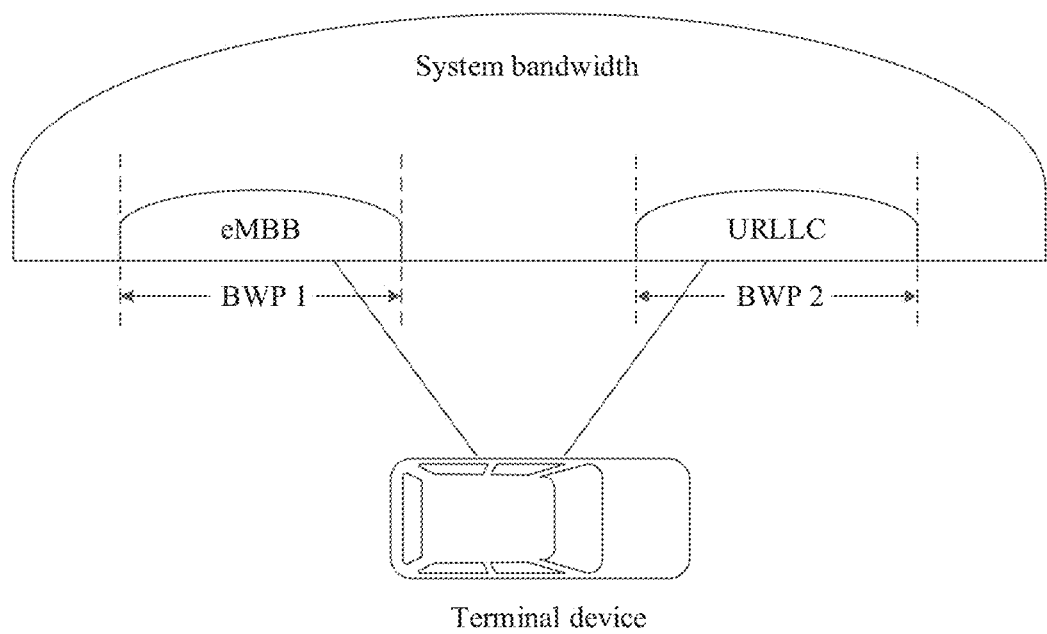
FIG. 5 is a schematic diagram of a first application scenario according to an embodiment of this application.

V2X scenarios include a security-related V2X scenario, for example, self-driving, and further include a non-security-related V2X scenario, for example, entertainment with a high mobile data rate. Some terminal devices need to perform both a self-driving service and an information entertainment activity, to be specific, need to transmit both the URLLC service and the eMBB service, or need to quickly switch from the eMBB service to the URLLC service. As shown in FIG. 5, a terminal device needs to transmit an eMBB service in a BWP 1, and needs to transmit a URLLC service in a BWP 2.

Scenario 2: In an unlicensed spectrum, listen-before-talk (LBT) carrier sensing is simultaneously performed in a plurality of BWPs.

Figure 6:
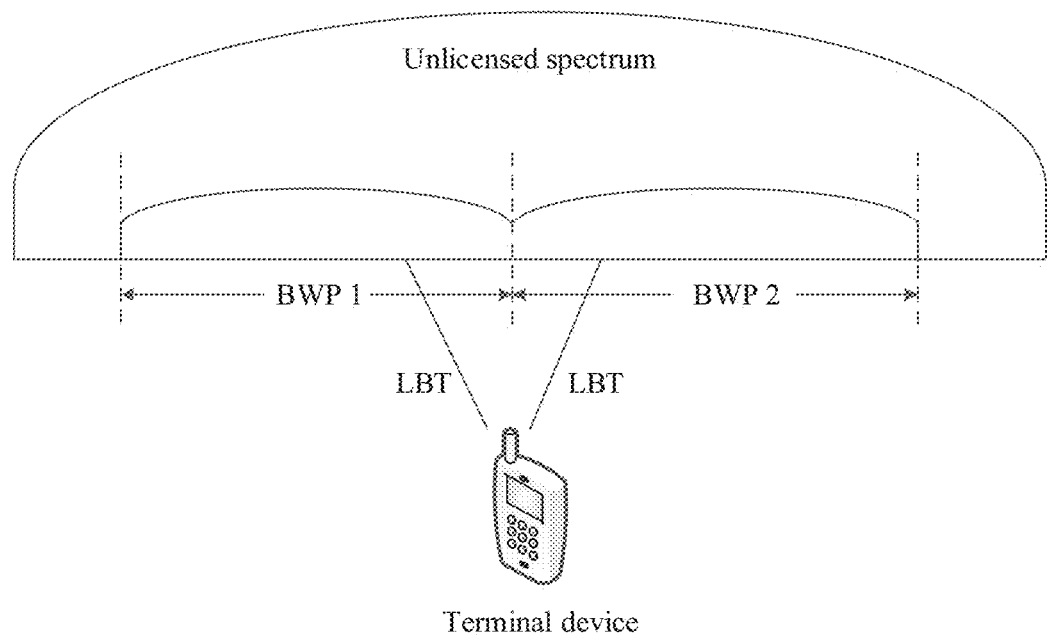
FIG. 6 is a schematic diagram of a second application scenario according to an embodiment of this application.

In the unlicensed spectrum, a transmitter first needs to detect whether a transmission resource is in an idle state. If the transmission resource is not in the idle state, random fallback is required, resulting in a higher latency and a lower user throughput. In this case, to improve an access possibility and the user throughput, one carrier may be divided into a plurality of BWPs, and a terminal device separately performs LBT in each BWP, to obtain a higher access opportunity and to more quickly switch to another BWP to perform the LBT. As shown in FIG. 6, one carrier includes a plurality of BWPs, including a BWP 1 and a BWP 2. A terminal device may separately perform LBT in the BWP 1 and the BWP 2.

Scenario 3: Transmission is performed on both an uplink Uu and a sidelink in a V2X scenario.

Figure 7:
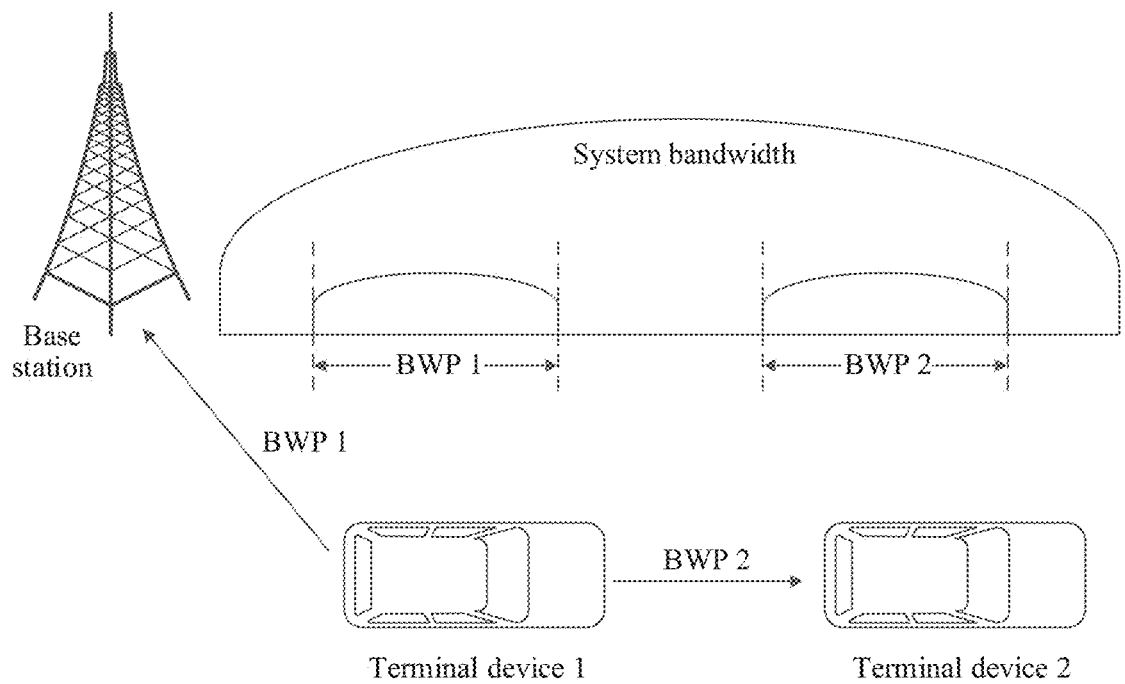
FIG. 7 is a schematic diagram of a third application scenario according to an embodiment of this application.

The uplink Uu may be understood as that a terminal device sends uplink data to a base station, and the sidelink may be understood as device-to-device (D2D) communication. To improve V2X performance, the uplink and the sidelink may be frequency division multiplexed in frequency domain or time domain multiplexed in time domain. For example, referring to FIG. 7, a BWP 1 may be used to transmit an uplink (UL) road condition report of a terminal device 1 to a base station, and a BWP 2 may be used to transmit security-related information of a sidelink of the terminal device 1 to a terminal device 2.

Figure 8:
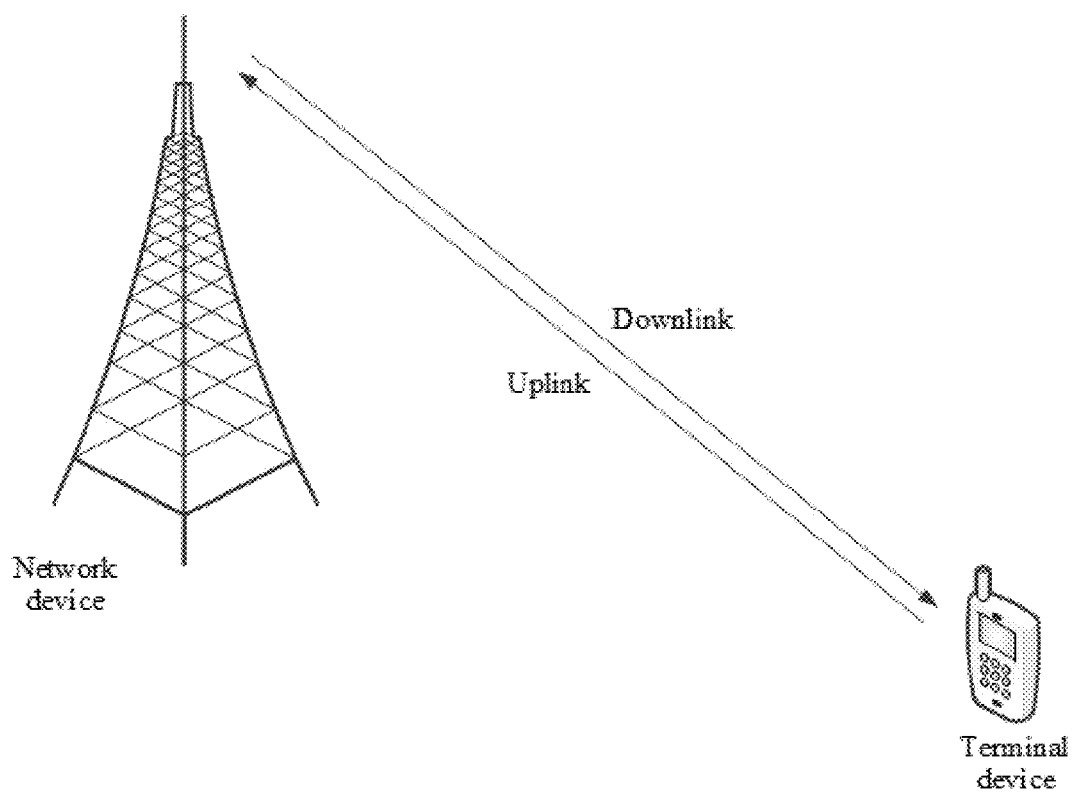
FIG. 8 is a schematic diagram of a network architecture to which an embodiment of this application is applied.

The foregoing describes currently existing problems, and describes the several possible application scenarios of the technical solutions in the embodiments of this application. The following describes a network architecture to which an embodiment of this application is applied. Refer to FIG. 8.

FIG. 8 includes a network device and a terminal device, and the terminal device is connected to the network device. Certainly, a quantity of terminal devices in FIG. 8 is merely an example. In an actual application, the network device may serve a plurality of terminal devices, and all or some of the plurality of terminal devices may send capability information to the network device by using a method provided in the embodiments of this application.

The network device in FIG. 8 is, for example, an access network (AN) device, for example, a base station. The access network device corresponds to different devices in different systems. For example, the access network device may correspond to an eNB in a 4th generation (4G) system, and correspond to an access network device, for example, a gNB, in a 5th generation (5G) system.

The following describes the technical solutions provided in the embodiments of this application with reference to the accompanying drawings.

Figure 9A:
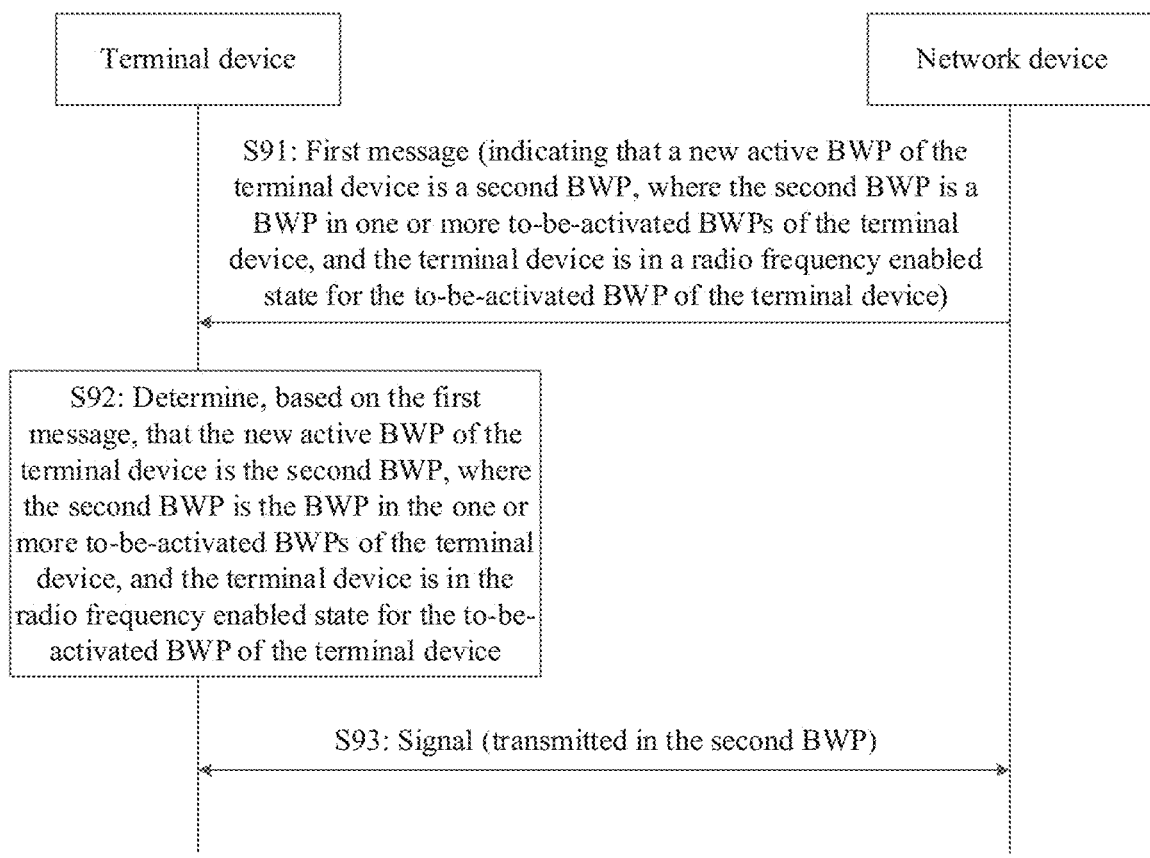
FIG. 9A is a flowchart of a signal transmission method according to an embodiment of this application.

An embodiment of this application provides a signal transmission method. FIG. 9A is a flowchart of the method. In the following description process, an example in which the method is applied to the network architecture shown in FIG. 8 is used. In addition, the method may be performed by two communications apparatuses. The two communications apparatuses are, for example, a first communications apparatus and a second communications apparatus. The first communications apparatus may be a network device or a communications apparatus that can support a network device in implementing a function required for the method, or the first communications apparatus may be a terminal device or a communications apparatus that can support a terminal device in implementing a function required for the method. Certainly, the first communications apparatus may alternatively be another communications apparatus, for example, a chip system. Similarly, the second communications apparatus may be a network device or a communications apparatus that can support a network device in implementing a function required for the method, or the second communications apparatus may be a terminal device or a communications apparatus that can support a terminal device in implementing a function required for the method. Certainly, the second communications apparatus may alternatively be another communications apparatus, for example, a chip system. In addition, implementations of the first communications apparatus and the second communications apparatus are not limited. For example, the first communications apparatus may be a network device, and the second communications apparatus is a terminal device; or both the first communications apparatus and the second communications apparatus are network devices; or both the first communications apparatus and the second communications apparatus are terminal devices; or the first communications apparatus is a network device, and the second communications apparatus is a communications apparatus that can support a terminal device in implementing a function required for the method. For example, the network device is a base station.

For ease of description, the following uses an example in which the method is performed by a network device and a terminal device, that is, an example in which the first communications apparatus is the network device and the second communications apparatus is the terminal device.

S91: The network device sends a first message in an active first BWP, and the terminal device receives the first message in the active first BWP. For the network device, the first message is used to indicate a new active BWP of the terminal device. In this embodiment, an example in which the new active BWP indicated by the first message is a second BWP is used. The second BWP is a BWP in one or more to-be-activated BWPs of the terminal device, and the to-be-activated BWP corresponds to a state configured by the network device for the terminal device, that is, the first message is used to indicate the new active BWP of the terminal device. In an actual application, the first message may indicate a to-be-activated BWP or a non-to-be-activated BWP. This is not specifically limited, and an example in which the first message indicates a to-be-activated BWP is merely used in this embodiment.

S92: The terminal device determines, based on the first message, that the new active BWP of the terminal device is the second BWP, where the second BWP is the BWP in the one or more to-be-activated BWPs of the terminal device, and the to-be-activated BWP corresponds to the state configured by the network device for the terminal device.

S93: The network device and the terminal device transmit a signal with each other in the second BWP.

When the network device and the terminal device communicate with each other in the BWP in a wireless manner, the network device manages system frequency resources, and allocates a frequency resource from the system frequency resources to the terminal device, so that the network device and the terminal device can communicate with each other by using the allocated frequency resource. The system frequency resource may be a frequency resource that can be managed and allocated by the network device, or may be a frequency resource that can be used for communication between the network device and the terminal device. In frequency domain, a width of the system frequency resource may be referred to as a bandwidth of the system frequency resource, a carrier bandwidth, a system bandwidth, or a transmission bandwidth.

In the embodiments of this application, the first BWP may be a downlink BWP, and the second BWP may be an uplink BWP or a downlink BWP. If the second BWP is a downlink BWP, the network device may send a downlink signal in the second BWP, and the terminal device may receive the downlink signal in the second BWP. The downlink signal may include one or more of a physical downlink shared channel (PDSCH), a synchronization signal, a downlink reference signal, and a physical downlink control channel (PDCCH). Alternatively, if the second BWP is an uplink BWP, the terminal device may send an uplink signal in the second BWP, and the network device may receive the uplink signal in the second BWP. The uplink signal may include one or more of a physical uplink shared channel (PDSCH), a physical random access channel (PRACH), a physical uplink control channel (PUCCH), an acknowledgement (ACK)/a negative acknowledgement (NACK), and an uplink reference signal.

Optionally, the first message may be a message used to instruct the terminal device to switch a BWP. In this case, the first message may carry an index of the new active BWP. From a perspective of switching, the new active BWP may also be referred to as a target active BWP, and a BWP before switching, namely, the first BWP, may also be referred to as a source BWP. After receiving the first message, the terminal device may obtain the index of the new active BWP by parsing the first message. For example, if the first message carries an index of the second BWP, the new active BWP is the second BWP. For example, the first message may be implemented by using an RRC message, a media access control (MAC) control element (CE), or DCI.

The concept of "to-be-activated state" is proposed in the embodiments of this application. A BWP in the to-be-activated state may also be referred to as a to-be-activated BWP, and a BWP in an active state may also be referred to as an active BWP. The to-be-activated BWP corresponds to the state configured by the network device for the terminal device. For example, the terminal device is in a radio frequency enabled state for the to-be-activated BWP of the terminal device. This may be understood as that a difference between a to-be-activated BWP, an active BWP, and a configured BWP lies in that the active BWP is a BWP that is currently used by the terminal device to listen to a downlink control channel, and/or the active BWP is a BWP that is currently used by the terminal device to send and/or receive a signal, the to-be-activated BWP may be understood as a BWP in which the terminal device may directly listen to downlink control information, and/or a BWP in which the terminal device may directly send and/or receive a signal, where if the network device indicates, in a current downlink control indication, that a BWP used by the terminal device to monitor a downlink control channel and/or send/receive a signal is the to-be-activated BWP, a latency of switching the BWP by the terminal device is approximately zero, and the terminal device needs to be instructed, by using signaling, to perform an activation operation first and then monitor a downlink control channel and/or send/receive a signal in the configured BWP. In this case, when switching from an active BWP to a to-be-activated BWP, the terminal device only needs to switch transmission of a signal to the to-be-activated BWP. In this way, the to-be-activated BWP becomes an active BWP. However, because only the transmission of the signal needs to be switched, and no other configuration operation needs to be performed, a switching latency is very low, and even switching with an approximately zero latency can be implemented. Therefore, the latency of switching the BWP by the terminal device is reduced, and communication quality is improved.

Optionally, in the embodiments of this application, if it is considered that the terminal device is in the radio frequency enabled state for the one or more to-be-activated BWPs of the terminal device, it may be considered that the one or more to-be-activated BWPs includes an active BWP.

Optionally, if the active BWP is understood as a BWP that can be directly used by the terminal device for signal transmission, for example, the terminal device is in a radio frequency enabled state for the active BWP, in the embodiments of this application, it may be understood that the network device simultaneously activates at least two uplink BWPs and/or downlink BWPs for the terminal device, but the terminal device can transmit signals only on one or more of the at least two active BWPs at a same moment. In this case, it may be understood that the to-be-activated BWP described in the foregoing paragraph in this embodiment of this application is an active BWP, the active BWP described in the foregoing paragraph may be understood as a BWP used by the terminal device to transmit a signal at a same moment.

As mentioned above, the second BWP is the BWP in the one or more to-be-activated BWPs of the terminal device, so that the one or more to-be-activated BWPs of the terminal device may include one or more BWPs. The following describes how the terminal device determines BWPs to be set as to-be-activated BWPs.

In this embodiment of this application, the network device may further send a second message, and the terminal device may receive the second message. The second message may be understood as a configuration message, and is used by the network device to configure one or more BWPs for the terminal device. For example, the second message may be implemented by using an RRC message, a MAC CE, or DCI. The second message may be transmitted in the first BWP, or may be transmitted in another BWP. The terminal device may determine the one or more to-be-activated BWPs of the terminal device based on the second message, that is, determine one or more BWPs that are configured by the network device and that are to be set as the one or more to-be-activated BWPs. The one or more to-be-activated BWPs determined by the terminal device may be at least two uplink BWPs and/or at least two downlink BWPs in the one or more BWPs configured by the network device for the terminal device. For example, the one or more to-be-activated BWPs determined by the terminal device are at least two uplink BWPs and at least two downlink BWPs in the one or more BWPs configured by the network device for the terminal device; or the one or more to-be-activated BWPs determined by the terminal device are at least two uplink BWPs in the one or more BWPs configured by the network device for the terminal device; or the one or more to-be-activated BWPs determined by the terminal device are at least two downlink BWPs in the one or more BWPs configured by the network device for the terminal device. Alternatively, the one or more to-be-activated BWPs determined by the terminal device may be at least one uplink BWP and/or at least one downlink BWP in the one or more BWPs configured by the network device for the terminal device. For example, the one or more to-be-activated BWPs determined by the terminal device are at least one uplink BWP and at least one downlink BWP in the one or more BWPs configured by the network device for the terminal device; or the one or more to-be-activated BWPs determined by the terminal device are at least one uplink BWP in the one or more BWPs configured by the network device for the terminal device; or the one or more to-be-activated BWPs determined by the terminal device are at least one downlink BWP in the one or more BWPs configured by the network device for the terminal device. In this case, the at least two uplink BWPs may be included in the at least one uplink BWP, and the at least two downlink BWPs may be included in the at least one downlink BWP.

In this embodiment of this application, an example in which the one or more to-be-activated BWPs determined by the terminal device are at least two uplink BWPs and/or at least two downlink BWPs in the one or more BWPs configured by the network device for the terminal device is mainly used for description.

Figure 10A:
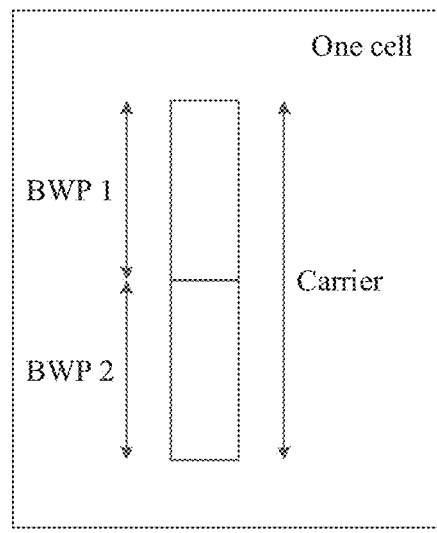
FIG. 10A is a schematic diagram in which a network device configures a BWP for a terminal device in a cell according to an embodiment of this application.
Figure 10B:
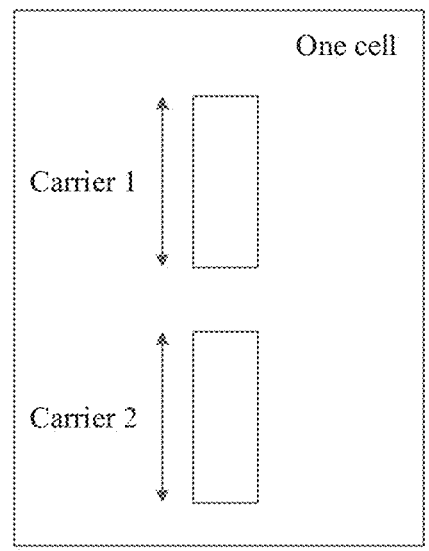
FIG. 10B is another schematic diagram in which a network device configures a BWP for a terminal device in a cell according to an embodiment of this application.

For example, there are one or more carriers in a cell, and the network device may configure one or more BWPs for the terminal device in at least one of the one or more carriers. As shown in FIG. 10A, the network device configures two BWPs for the terminal device in one carrier. As shown in FIG. 10B, the network device configures one BWP for the terminal device in each of two carriers. For example, the network device may configure the one or more BWPs for the terminal device by using the second message, or may configure the one or more BWPs for the terminal device by using another message. In this specification, an example in which the network device configures the one or more BWPs for the terminal device by using the second message is used. For a specific manner of configuring the one or more BWPs by the network device, refer to the foregoing descriptions. Details are not described herein again. When configuring the one or more BWPs for the terminal device, the network device may configure an uplink BWP and/or a downlink BWP for the terminal device. The uplink BWP is used by the terminal device to send a signal to the network device, and the downlink BWP is used by the network device to send a signal to the terminal device.

In this embodiment of this application, the one or more BWPs configured by the network device for the terminal device may include N uplink BWPs and/or M downlink BWPs. For example, the one or more BWPs configured by the network device for the terminal device includes N uplink BWPs and M downlink BWPs; or the one or more BWPs configured by the network device for the terminal device includes N uplink BWPs; or the one or more BWPs configured by the network device for the terminal device includes M downlink BWPs. N and M are positive integers. For example, both N and M are integers greater than or equal to 2. The one or more BWPs configured by the network device for the terminal device includes the one or more to-be-activated BWPs determined by the terminal device based on the second message. A quantity of the one or more BWPs configured by the network device for the terminal device, namely, a value of N+M, may be greater than or equal to a quantity of the one or more to-be-activated BWPs determined by the terminal device based on the second message.

In this embodiment of this application, after determining the N uplink BWPs and/or the M downlink BWPs to be configured for the terminal device, the network device may directly configure the N uplink BWPs and/or the M downlink BWPs for the terminal device; or may group the N uplink BWPs and/or the M downlink BWPs to obtain P BWP groups, and then configure the P BWP groups for the terminal device, where P is a positive integer. For example, the network device may configure the P BWP groups for the terminal device by using the second message, or may configure the P BWP groups for the terminal device by using another message. The following separately describes a case in which the network device groups the one or more BWPs or a case in which the network device does not group the one or more BWPs.

1. In this embodiment of this application, the network device groups the N uplink BWPs and/or the M downlink BWPs that are determined to be configured for the terminal device.

The network device may use a plurality of grouping manners. Two grouping manners are described in this specification. A person skilled in the art may clearly know that a specific grouping manner is not limited in the embodiments.

1. A First Grouping Manner

In the first grouping manner, the network device configures N+M BWPs for the terminal device by using P BWP groups; or the network device groups N+M BWPs that are determined to be configured for the terminal device into P BWP groups, where one of the P BWP groups may include at least one uplink BWP and at least one downlink BWP. Quantities of uplink BWPs included in different BWP groups may be the same or may be different, and quantities of downlink BWPs included in different BWP groups may be the same or may be different.

In an implementation, the network device may perform grouping based on a service type. For example, a BWP included in one BWP group is applicable to one type of service. For example, the network device determines to configure four uplink BWPs and four downlink BWPs for the terminal device, the network device groups the four uplink BWPs and the four downlink BWPs into two BWP groups, and each BWP group includes two uplink BWPs and two downlink BWPs. A BWP included in the first group is applicable to transmission of a first-type service, for example, an eMBB service, and a BWP included in the second group is applicable to transmission of a second-type service, for example, a URLLC service. In this example, different BWP groups include a same quantity of uplink BWPs, and different BWP groups include a same quantity of downlink BWPs. This is not specifically limited thereto.

Certainly, the network device may alternatively perform grouping based on another factor in addition to the service type. This is not specifically limited.

In an implementation, in addition to configuring the BWP groups for the terminal device, the network device may further configure at least one to-be-activated uplink BWP and at least one to-be-activated downlink BWP for each of at least one of the BWP groups, and both the at least one to-be-activated uplink BWP and the at least one to-be-activated downlink BWP are included in the one or more to-be-activated BWPs of the terminal device that are determined by the network device. For example, the network device may configure, by using the second message, at least one to-be-activated uplink BWP and at least one to-be-activated downlink BWP for at least one of the P BWP groups; or configure, by using another message, at least one to-be-activated uplink BWP and at least one to-be-activated downlink BWP for at least one of the P BWP groups. In the foregoing descriptions, the network device configures the at least two uplink BWPs and/or the at least two downlink BWPs as the to-be-activated BWPs for the terminal device, and both the at least two uplink BWPs and the at least two downlink BWPs belong to the BWPs configured by the network device for the terminal device. In this case, in the first grouping manner, a total quantity of all to-be-activated uplink BWPs included in at least one BWP group is equal to a total quantity of the at least two uplink BWPs that are configured by the network device and that are used as the to-be-activated BWPs, and a total quantity of all to-be-activated downlink BWPs included in at least one BWP group is equal to a total quantity of the at least two downlink BWPs that are configured by the network device and that are used as the to-be-activated BWPs.

In a special example of this implementation, the network device may configure one to-be-activated uplink BWP and one to-be-activated downlink BWP for each of the at least one of the P BWP groups. The network device configures one downlink carrier and one uplink carrier for the terminal device, and the network device configures one or more uplink BWPs for the terminal device in the uplink carrier, and configures one or more downlink BWPs for the terminal device in the downlink carrier. The network device further configures a BWP group for the terminal device. For example, each BWP group may include the one or more downlink BWPs in the downlink carrier and the one or more uplink BWPs in the uplink carrier. For such a BWP group, the network device may set one of the one or more uplink BWPs as the to-be-activated uplink BWP and set one of the one or more downlink BWPs as the to-be-activated downlink BWP.

Alternatively, a special example of the uplink carrier, namely, a supplementary uplink (supplementary (supplemental) UL, SUL) carrier, further exists. In this case, in another special example of this implementation, the network device may configure two to-be-activated uplink BWPs and one to-be-activated downlink BWP for each of the at least one of the P BWP groups. For example, the network device configures one downlink carrier, one uplink carrier, and one SUL carrier for the terminal device, and the network device configures one or more uplink BWPs for the terminal device in the uplink carrier, configures one or more uplink BWPs for the terminal device in the SUL carrier, and configures one or more downlink BWPs for the terminal device in the downlink carrier. For differentiation, the uplink BWP configured for the terminal device in the SUL carrier is referred to as an uplink SUL BWP. The network device further configures a BWP group for the terminal device. For example, each BWP group may include the one or more downlink BWPs in the downlink carrier, the one or more uplink BWPs in the uplink carrier, and the one or more uplink SUL BWPs in the SUL carrier. For such a BWP group, the network device may set one of the one or more uplink BWPs as the to-be-activated uplink BWP, set one of the one or more uplink SUL BWPs as the to-be-activated uplink BWP, and set one of the one or more downlink BWPs as the to-be-activated downlink BWP. That is, the two to-be-activated uplink BWPs are respectively the uplink BWP and the uplink SUL BWP.

Optionally, a quantity of to-be-activated uplink BWPs configured by the network device for one BWP group is less than or equal to a quantity of uplink BWPs included in the BWP group, and a quantity of to-be-activated downlink BWPs configured by the network device for one BWP group is less than or equal to a quantity of downlink BWPs included in the BWP group. In one BWP group, in addition to at least one to-be-activated uplink BWP and at least one to-be-activated downlink BWP if the BWP group further includes another BWP, the another BWP is a BWP in anon-to-be-activated state, or is referred to as a non-to-be-activated BWP, and the terminal device may be in a radio frequency disabled state for the non-to-be-activated BWP of the terminal device. It may be understood that, if the terminal device needs to switch from an active BWP to a to-be-activated BWP, the terminal device may only need to switch transmission of a signal to the to-be-activated BWP without needing to perform any other setting operation. If the terminal device needs to switch from an active BWP to a non-to-be-activated BWP, the terminal device needs to perform an activation operation on the non-to-be-activated BWP, and only after the activation operation, the terminal device can switch transmission of a signal to the non-to-be-activated BWP that is activated. It is clear that a relatively long time is required.

Optionally, the at least one to-be-activated uplink BWP and the at least one to-be-activated downlink BWP are configured in the BWP group, so that when switching to the BWP group, the terminal device can directly switch to one of the at least one to-be-activated uplink BWP, or switch to one of the at least one to-be-activated downlink BWP, without needing to perform excessive BWP selection operations, thereby reducing signaling overheads.

After receiving the configuration performed by the network device, the terminal device may determine the P BWP groups. For example, the terminal device may learn of information about each of the P BWP groups. The information about the BWP group is, for example, an identifier or an index of the BWP group. The terminal device may further learn of information about all BWPs included in each BWP group, and the information about the BWP includes, for example, an index or an identifier of the BWP.

Optionally, a configuration process of the network device may be performed in an initial random access process of the terminal device. To be specific, the second message (or another configuration message) may be transmitted in the initial random access process of the terminal device. Alternatively, a configuration process of the network device may be performed after an initial random access process of the terminal device is completed. To be specific, the second message (or another configuration message) may be transmitted after the initial random access process of the terminal device. For example, the second message is an RRC message after the initial random access of the terminal device is completed.

Optionally, after receiving the configuration performed by the network device, the terminal device has the N uplink BWPs and the M downlink BWPs that are configured by the network device, and the BWPs belong to the P BWP groups. Further, each of the at least one of the P BWP groups may further include at least one to-be-activated uplink BWP and at least one to-be-activated downlink BWP. The to-be-activated uplink BWP is an uplink BWP in the to-be-activated state, and the to-be-activated downlink BWP is a downlink BWP in the to-be-activated state.

Optionally, in a special example, the network device may configure one to-be-activated uplink BWP and one to-be-activated downlink BWP for each of the at least one of the P BWP groups. For example, after the terminal device completes the initial random access, the network device configures four uplink BWPs for the terminal device, where the four uplink BWPs are respectively an uplink BWP 0 to an uplink BWP 3; configures four downlink BWPs, where the four downlink BWPs are respectively a downlink BWP 0 to a downlink BWP 3: and configures two BWP groups for the terminal device, where a BWP group 0 includes the uplink BWP 0, the uplink BWP 1, the downlink BWP 0, and the downlink BWP 1, and a BWP group 1 includes the uplink BWP 2, the uplink BWP 3, the downlink BWP 2, and the downlink BWP 3. The network device further configures the uplink BWP 0 as a to-be-activated uplink BWP in the BWP group 0, the downlink BWP 0 as a to-be-activated downlink BWP in the BWP group 0, the uplink BWP 3 as a to-be-activated uplink BWP in the BWP group 1, and the downlink BWP 3 as a to-be-activated downlink BWP in the BWP group 1. In this case, after receiving the configuration performed by the network device, the terminal device may determine information about the uplink BWP 0 to the uplink BWP 3, the downlink BWP 0 to the downlink BWP 3, the BWP group 0, and the BWP group 1, and may further determine that the uplink BWP 0, the downlink BWP 0, the uplink BWP 3, and the downlink BWP 3 are all to-be-activated BWPs.

Optionally, in another special example, the network device may configure two to-be-activated uplink BWPs and one to-be-activated downlink BWP for each of the at least one of the P BWP groups. For example, after the terminal device completes the initial random access, the network device configures six uplink BWPs for the terminal device, where four BWPs are configured in an uplink carrier and the four BWPs are respectively an uplink BWP 0 to an uplink BWP 3, and two uplink BWPs are configured in an SUL carrier and the two uplink BWPs are respectively an uplink BWP 4 and an uplink BWP 5; configure four downlink BWPs in a downlink carrier, where the four downlink BWPs are respectively a downlink BWP 0 to a downlink BWP 3; and configures two BWP groups for the terminal device, where a BWP group 0 includes the uplink BWP 0 and the uplink BWP 1 in the uplink carrier, the uplink BWP 4 in the SUL carrier, and the downlink BWP 0 and the downlink BWP 1 in the downlink carrier; and a BWP group 1 includes the uplink BWP 2 and the uplink BWP 3 in the uplink carrier, the uplink BWP 5 in the SUL carrier, and the downlink BWP 2 and the downlink BWP 3 in the downlink carrier. The network device further configures the uplink BWP 0 in the uplink carrier and the uplink BWP 4 in the SUL carrier as to-be-activated uplink BWPs in the BWP group 0, the downlink BWP 0 in the downlink carrier as a to-be-activated downlink BWP in the BWP group 0, the uplink BWP 3 in the uplink carrier and the uplink BWP 5 in the SUL carrier as to-be-activated uplink BWPs in the BWP group 1, and the BWP 3 in the downlink carrier as a to-be-activated downlink BWP in the BWP group 1. In this case, after receiving the configuration performed by the network device, the terminal device may determine information about the uplink BWP 0 to the uplink BWP 3 in the uplink carrier, the uplink BWP 4 and the uplink BWP 5 in the SUL carrier, the downlink BWP 0 to the downlink BWP 3 in the downlink carrier, the BWP group 0, and the BWP group 1; and may further determine that the uplink BWP 0 in the uplink carrier, the uplink BWP 4 in the SUL carrier, the BWP 0 in the downlink carrier, the uplink BWP 3 in the uplink carrier, the uplink BWP 5 in the SUL carrier, and the downlink BWP 3 in the downlink carrier are all to-be-activated BWPs.

Optionally, after receiving the second message, the terminal device may determine the one or more to-be-activated BWPs of the terminal device based on the second message. As described above, the network device may further configure the P BWP groups for the terminal device. In this case, the terminal device may further determine that each of the one or more to-be-activated BWPs of the terminal device belongs to a corresponding BWP group. For example, one of the one or more to-be-activated BWPs of the terminal device may be a BWP in one BWP group of the terminal device, the second BWP, or another to-be-activated BWP. For example, the BWP group includes $K_1$ uplink BWPs and $K_2$ downlink BWPs, where both $K_1$ and $K_2$ are positive integers, and $K_1$ and $K_2$ may be equal to or may not be equal to each other. In addition, if the network device further configures at least one to-be-activated uplink BWP and at least one to-be-activated downlink BWP for each of the at least one of the P BWP groups, the terminal device may determine that one of the at least one of the P BWP groups may include at least one to-be-activated uplink BWP and at least one to-be-activated downlink BWP. The at least one to-be-activated uplink BWP and the at least one to-be-activated downlink BWP are included in the one or more to-be-activated BWPs of the terminal device. In other words, the at least one to-be-activated uplink BWP and the at least one to-beactivated downlink BWP both belong to the one or more to-be-activated BWPs of the terminal device. For example, the BWP group includes $K_3$ uplink BWPs and $K_4$ downlink BWPs, where both $K_3$ and $K_4$ are positive integers, and $K_3$ and $K_3$ may be equal to or may not be equal to each other. In addition, the BWP group and the foregoing BWP group including the $K_1$ uplink BWPs and the $K_2$ downlink BWPs may be a same BWP group. In this case, $K_1=K_3$ and $K_4=K_2$ Alternatively, the two BWP groups may be different BWP groups. In this case, $K_1$ and $K_3$ may be equal to or may be not equal to each other, and $K_4$ and $K_2$ may be equal to or may be not equal to each other.

In this embodiment of this application, when configuring the P BWP groups for the terminal device, the network device may indicate, to the terminal device, that all or some of the BWP groups are configured to be in the to-be-activated state. For example, the network device may indicate, by using the second message or another message, which all or some of the BWP groups of the terminal device are in the to-be-activated state. Setting one BWP group to be in the to-be-activated state may be setting all or some of BWPs included in the BWP group to be in the to-be-activated state. For example, the network device further configures at least one to-be-activated uplink BWP and at least one to-be-activated downlink BWP for each of at least one of the P BWP groups. In this case, it may be considered that the at least one BWP group is set by the network device to be in the to-be-activated state. This is also the same for the terminal device. For example, the network device further configures at least one to-be-activated uplink BWP and at least one to-be-activated downlink BWP for each of at least one of the P BWP groups. In this case, the network device may instruct the terminal device to further set the at least one to-be-activated uplink BWP and the at least one to-be-activated downlink BWP in each of the at least one of the P BWP groups to be in the to-be-activated state. In other words, for the terminal device, the at least one BWP group is set to be in the to-be-activated state.

Optionally, if the network device sets one to-be-activated uplink BWP and one to-be-activated downlink BWP or sets two to-be-activated uplink BWPs and one to-be-activated downlink BWP in each of at least one of the BWP groups, the two to-be-activated uplink BWPs include one uplink BWP in the to-be-activated state and one uplink SUL BWP in the to-be-activated state. In this case, the network device and the terminal device may set at least two BWP groups to be in the to-be-activated state. However, if the network device sets a plurality of to-be-activated uplink BWPs and/or a plurality of to-be-activated downlink BWPs in one or more BWP groups of the at least one BWP group, the network device and the terminal device may set the at least one BWP group to be in the to-be-activated state. In conclusion, it can be ensured that the one or more to-be-activated BWPs of the terminal device are at least two downlink BWPs and/or at least two uplink BWPs in the one or more BWPs of the terminal device.

Figure 9B:
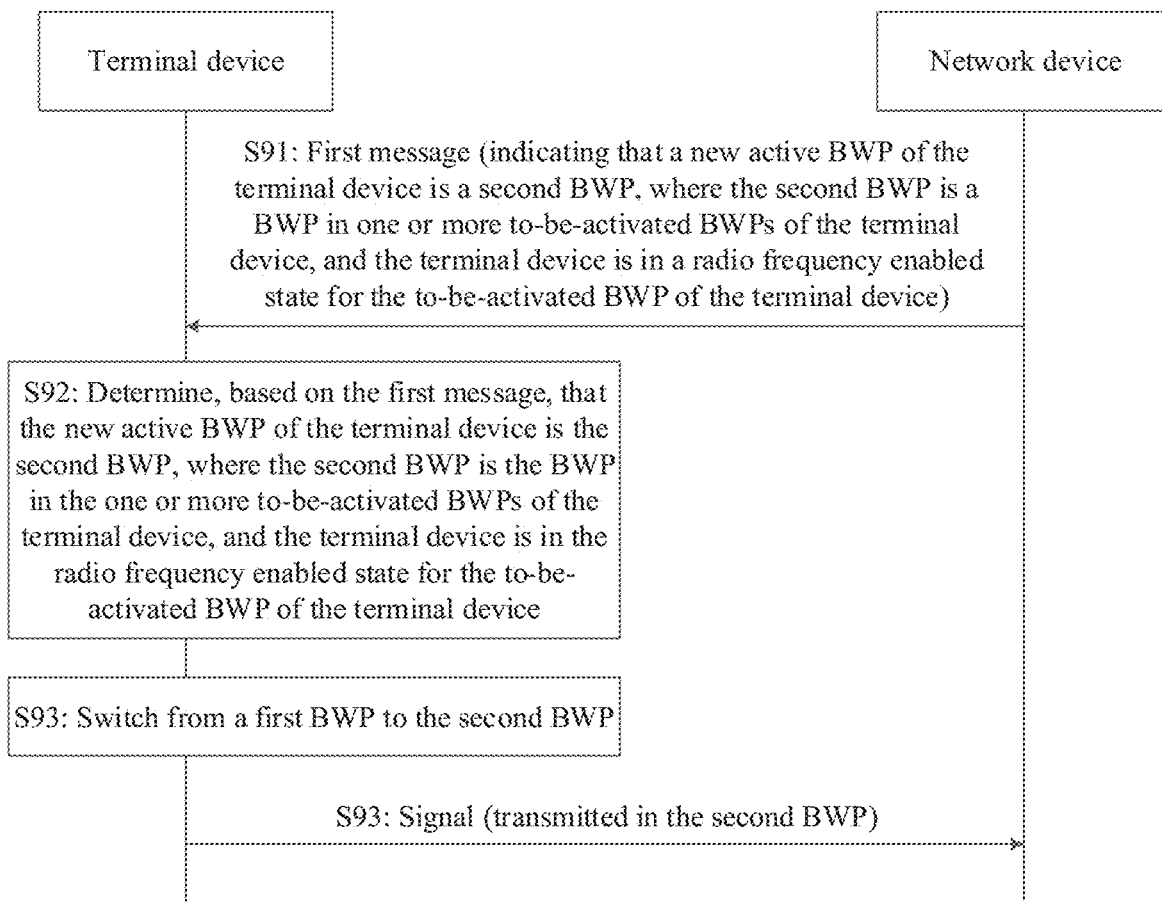
FIG. 9B is another flowchart of a signal transmission method according to an embodiment of this application.

For example, after configuring the P BWP groups, the network device sets all the P BWP groups to be in the to-be-activated state. In this case, the terminal device further sets all the P BWP groups to the to-be-activated state as indicated by the network device, and a manner of setting all the P BWP groups to be in the to-be-activated state is: The network sets one to-be-activated uplink BWP and one to-be-activated downlink BWP for each BWP group that is in the P BWP groups and that does not include any uplink SUL BWP, and the network device sets two to-be-activated uplink BWPs and one to-be-activated downlink BWP for each BWP group that is in the P BWP groups and that includes an uplink SUL BWP. The two to-be-activated uplink BWPs include an uplink BWP set to be in the to-be-activated state and an uplink SUL BWP set to be in the to-be-activated state. In an example, the first message sent by the network device may not need to indicate a specific index of the new active BWP, but may indicate information about a BWP group, for example, an identifier or an index of the BWP group. As the terminal device determines the BWP group, the terminal device may directly switch to a to-be-activated uplink BWP and a to-be-activated downlink BWP in the BWP group by default, without needing to determine BWPs to which the terminal device is to switch one by one, thereby facilitating an operation of the terminal device. If switching is related, S93 may also be understood as that the terminal device switches to the second BWP, and the network device and the terminal device transmit a signal with each other in the second BWP. Therefore, for a corresponding flowchart in the embodiment shown in FIG. 9A, refer to FIG. 9B. In FIG. 9B, S93 includes two processes. One process is that the terminal device switches from the first BWP to the second BWP, and the other process is that the terminal device and the network device transmit a signal with each other in the second BWP. S91 in FIG. 9B may be the same as S91 in FIG. 9A, and S92 in FIG. 9B may be the same as S92 in FIG. 9A. After the terminal device switches to the second BWP, the second BWP also changes from the to-be-activated state to the active state. In other words, the second BWP changes to an active BWP. Therefore, it may also be considered that the terminal device activates the second BWP.

For example, after the terminal device completes the initial random access, the network device configures four uplink BWPs for the terminal device, where the four uplink BWPs are respectively an uplink BWP 0 to an uplink BWP 3, configures four downlink BWPs, where the four downlink BWPs are respectively a downlink BWP 0 to a downlink BWP 3, and configures two BWP groups for the terminal device, where a BWP group 0 includes the uplink BWP 0, the uplink BWP 1, the downlink BWP 0, and the downlink BWP 1, and a BWP group 1 includes the uplink BWP 2, the uplink BWP 3, the downlink BWP 2, and the downlink BWP 3. The network device configures the uplink BWP 0 as a to-be-activated uplink BWP in the BWP group 0, the downlink BWP 0 as a to-be-activated downlink BWP in the BWP group 0, the uplink BWP 3 as a to-be-activated uplink BWP in the BWP group 1, and the downlink BWP 3 as a to-be-activated downlink BWP in the BWP group 1. For example, the terminal device initially works in the BWP group 0, that is, works in the uplink BWP 0 or the downlink BWP 0. In this case, the network device sends the first message to the terminal device, and a manner of indicating the new active BWP by using the first message is, for example, indicating information about a BWP group. For example, the first message indicates an index of the BWP group 1. In this case, the terminal device determines that a target BWP to which the terminal device is to switch is located in the BWP group 1, and the terminal device switches to the uplink BWP 3 or the downlink BWP 3 in the BWP group 1 by default. It may be considered that an index of the BWP does not need to be additionally obtained from the network device.

In a special example, the network device configures one downlink carrier, one uplink carrier, and one SUL carrier for the terminal device, and the network device configures one or more uplink BWPs for the terminal device in the uplink carrier, configures one or more uplink SUL BWPs for the terminal device in the SUL carrier, and configures one or more downlink BWPs for the terminal device in the downlink carrier. The network device further configures a BWP group for the terminal device. For example, each BWP group may include the one or more downlink BWPs in the downlink carrier, the one or more uplink BWPs in the uplink carrier, and the one or more uplink SUL BWPs in the SUL carrier. For such a BWP group, the network device may set one of the one or more uplink BWPs as the to-be-activated uplink BWP, set one of the one or more uplink SUL BWPs as the to-be-activated uplink BWP, and set one of the one or more downlink BWPs as the to-be-activated downlink BWP. That is, the two to-be-activated uplink BWPs are respectively the uplink BWP and the uplink SUL BWP. For such a BWP group, when instructing the terminal device to switch an uplink BWP, the network device may further indicate an identifier of a carrier. For example, the network device may indicate, by using the first message, an identifier of the BWP group and an identifier of a carrier in which a target to-be-activated uplink BWP to which the terminal device is to switch is located, to indicate an uplink carrier in which the target uplink BWP to which the terminal device is to switch is located.

For example, after configuring the P BWP groups, the network device sets all or some of the P BWP groups to be in the to-be-activated state. In this case, during communication with the terminal device, the network device may keep the BWP groups in the to-be-activated state all the time. Certainly, the network device may alternatively instruct the terminal device to keep the BWP groups in the to-be-activated state all the time. That the BWP group remains in the to-be-activated state may mean that at least one BWP in the BWP group remains in the to-be-activated state, that is, the terminal device is in the radio frequency enabled state for the at least one BWP.

If the network device sets some of the BWP groups to be in the to-be-activated state after configuring the BWP groups, the network device may further update, in a communication process, the BWP group that is set to be in the to-be-activated state, and the network device may instruct, by using a message, the terminal device to update the BWP group that is set to be in the to-be-activated state. The message is, for example, an RRC message, a MAC CE, or DCI. The updating may include: setting, to be in the to-be-activated state, a BWP group that is not previously set to be in the to-be-activated state, and/or setting, to be in the non-to-be-activated state, the BWP group that is previously set to be in the to-be-activated state. The non-to-be-activated state, which is also referred to as an inactive state, in this specification means neither the active state nor the to-be-activated state. If a BWP in this state needs to be activated, an activation operation needs to be performed.

Optionally, the first grouping manner described above is applicable to a symmetric spectrum system and an asymmetric spectrum system. For the asymmetric spectrum system, a frequency domain center position of a to-be-activated uplink BWP is aligned with a frequency domain center position of a to-be-activated downlink BWP, and the to-be-activated uplink BWP and the to-be-activated downlink BWP are a BWP pair. If the terminal device activates one BWP in the BWP pair, the terminal device simultaneously activates the other BWP. For example, a downlink BWP of the terminal device is switched from a downlink BWP in a BWP group 1 to a downlink BWP in a BWP group 2, and a corresponding uplink BWP of the terminal device further needs to be switched to an uplink BWP paired with the downlink BWP in the BWP group 2. For the symmetric spectrum system, an uplink BWP and a downlink BWP may be independently activated and to be activated. For example, a downlink BWP of the terminal device is switched from a downlink BWP in a BWP group 1 to a downlink BWP in a BWP group 2. An uplink BWP of the terminal device may be switched or may not be switched, and whether the uplink BWP of the terminal device needs to be switched is determined by the network device. If the uplink BWP of the terminal device also needs to be switched, the network device may further indicate, in the first message, a target uplink BWP to which the terminal device is to switch.

Alternatively, for both the asymmetric spectrum system and the symmetric spectrum system, an uplink BWP and a downlink BWP of the terminal device may be selected for pairing. In this case, the N uplink BWPs and the M downlink BWPs configured by the network device for the terminal device include a plurality of BWP pairs. For example, a downlink BWP 1 and an uplink BWP 1 are a pair, and a downlink BWP 2 and an uplink BWP 2 are a pair. In this case, after a downlink BWP of the terminal device is switched from the downlink BWP 1 to the downlink BWP 2, an uplink BWP of the terminal device also needs to be switched from the uplink BWP 1 to the uplink BWP 2. In this case, during grouping, the network device may group the downlink BWP 1 and the uplink BWP 1 into one BWP group, and group the downlink BWP 2 and the uplink BWP 2 into one BWP group, and may further set the downlink BWP 2 as a to-be-activated downlink BWP in the BWP group in which the downlink BWP 2 is located, and set the uplink BWP 2 as a to-be-activated uplink BWP in the BWP group in which the uplink BWP 2 is located, so that the terminal device can directly switch the BWP group.

In the first grouping manner, one BWP group includes both an uplink BWP and a downlink BWP. The following describes a second grouping manner provided in the embodiments of this application.

2. Second Grouping Manner

In this embodiment of this application, in the second grouping manner, the network device may configure N+M BWPs for the terminal device by using D BWP groups, or the network device may group N+M BWPs that are determined to be configured for the terminal device into D BWP groups. One of the D BWP groups may include at least one uplink BWP or at least one downlink BWP. In other words, it may be considered that the D BWP groups include at least one uplink BWP group and at least one downlink BWP group. Quantities of uplink BWPs included in different uplink BWP groups may be the same or may be different, and quantities of downlink BWPs included in different downlink BWP groups may be the same or may be different.

In an implementation, the network device may directly group all uplink BWPs configured for the terminal device into one BWP group, and group all downlink BWPs configured for the terminal device into one BWP group. For example, the network device determines to configure four uplink BWPs and four downlink BWPs for the terminal device, where the four uplink BWPs are respectively an uplink BWP 0 to an uplink BWP 3, and the four downlink BWPs are respectively a downlink BWP 0 to a downlink BWP 3. The network device may group the four uplink BWPs and the four downlink BWPs into one uplink BWP group and one downlink BWP group. A BWP group 0 is the uplink BWP group, including the uplink BWP 0 to the uplink BWP 3: and a BWP group 1 is the downlink BWP group, including the downlink BWP 0 to the downlink BWP 3.

In another implementation, the network device may alternatively perform grouping based on a service type. For example, a BWP included in one BWP group is applicable to one type of service. For example, the network device determines to configure four uplink BWPs and four downlink BWPs for the terminal device, where the four uplink BWPs are respectively an uplink BWP 0 to an uplink BWP 3, and the four downlink BWPs are respectively a downlink BWP 0 to a downlink BWP 3. The network device groups the four uplink BWPs and the four downlink BWPs into two uplink BWP groups and two downlink BWP groups. A BWP group 0 includes the uplink BWP 0 and the uplink BWP 1, a BWP group 1 includes the uplink BWP 2 and the uplink BWP 3, a BWP group 2 includes the downlink BWP 0 and the downlink BWP 1, and a BWP group 3 includes the downlink BWP 2 and the downlink BWP 3. A BWP included in the BWP group 0 and the BWP group 2 is applicable to transmission of a first-type service, for example, an eMBB service. A BWP included in the BWP group 1 and the BWP group 3 is applicable to transmission of a second-type service, for example, a URLLC service. In this example, different uplink BWP groups include a same quantity of uplink BWPs, and different downlink BWP groups include a same quantity of downlink BWPs. This is not specifically limited thereto.

Alternatively, the network device may perform grouping based on another factor in addition to the service type. This is not specifically limited.

In this embodiment of this application, in addition to configuring the BWP groups for the terminal device, the network device may further configure at least one to-be-activated uplink BWP for each of at least one uplink BWP group of the D BWP groups, and/or at least one to-be-activated downlink BWP for each of at least one downlink BWP group of the D BWP groups. For example, the network device may configure at least one to-be-activated uplink BWP for each of at least one uplink BWP group of the D BWP groups; or the network device may configure at least one to-be-activated downlink BWP for each of at least one downlink BWP group of the D BWP groups; or the network device may configure at least one to-be-activated uplink BWP for each of at least one uplink BWP group of the D BWP groups, and configure at least one to-be-activated downlink BWP for each of at least one downlink BWP group of the D BWP groups. If the network device configures at least one to-be-activated uplink BWP for each of at least one uplink BWP group of the D BWP groups, the at least one to-be-activated uplink BWP is included in the one or more to-be-activated BWPs of the terminal device that are determined by the network device. If the network device configures at least one to-be-activated downlink BWP for each of at least one downlink BWP group of the D BWP groups, the at least one to-be-activated downlink BWP is further included in the one or more to-be-activated BWPs of the terminal device that are determined by the network device.

For example, the network device may configure, by using the second message, at least one to-be-activated uplink BWP for each of at least one uplink BWP group of the D BWP groups, and/or configure at least one to-be-activated downlink BWP for each of at least one downlink BWP group of the D BWP groups, or may configure, by using another message, at least one to-be-activated uplink BWP for each of at least one uplink BWP group of the D BWP groups, and/or configure at least one to-be-activated downlink BWP for each of at least one downlink BWP group of the D BWP groups. In the foregoing descriptions, the network device configures the at least two uplink BWPs and/or the at least two downlink BWPs as the to-be-activated BWPs for the terminal device. In this case, in the second grouping manner, a total quantity of all to-be-activated uplink BWPs included in at least one uplink BWP group of the D BWP groups is equal to a total quantity of the at least two uplink BWPs that are configured by the network device and that are used as the to-be-activated BWPs, and a total quantity of all to-be-activated downlink BWPs included in at least one downlink BWP group of the D BWP groups is equal to a total quantity of the at least two downlink BWPs that are configured by the network device and that are used as the to-be-activated BWPs.

Optionally, all to-be-activated BWPs configured by the network device may be uplink BWPs. In this case, the network device may configure only at least two uplink BWPs in one uplink BWP group as to-be-activated uplink BWPs, or may configure one or more uplink BWPs in each of a plurality of uplink BWP groups as one or more to-be-activated uplink BWPs. Alternatively, all to-be-activated BWPs configured by the network device may be downlink BWPs. In this case, the network device may configure only at least two downlink BWPs in one downlink BWP group as to-be-activated downlink BWPs, or may configure one or more downlink BWPs in each of a plurality of downlink BWP groups as one or more to-be-activated downlink BWPs. Alternatively, to-be-activated BWPs configured by the network device may include an uplink BWP and a downlink BWP. In this case, the network device may configure at least two uplink BWPs in one uplink BWP group as to-be-activated uplink BWPs, and configure at least two downlink BWPs in one downlink BWP group as to-be-activated downlink BWPs; or configure one or more uplink BWPs in each of a plurality of uplink BWP groups as one or more to-be-activated uplink BWPs, and configure one or more downlink BWPs in each of a plurality of downlink BWP groups as one or more to-be-activated downlink BWPs.

In a special example of this implementation, the network device may configure one to-be-activated uplink BWP for each of at least one uplink BWP group of the D BWP groups, and configure one to-be-activated downlink BWP for each of at least one downlink BWP group of the D BWP groups. For example, the network device configures one downlink carrier and one uplink carrier for the terminal device, and the network device configures one or more uplink BWPs in the uplink carrier for the terminal device, and configures one or more downlink BWPs in the downlink carrier for the terminal device. The network device further configures a BWP group for the terminal device, for example, configures one or more uplink BWP groups and one or more downlink BWP groups. Each uplink BWP group includes at least one uplink BWP, and each downlink BWP group includes at least one downlink BWP. The network device may set one uplink BWP in each of the at least one uplink BWP group as the to-be-activated uplink BWP, and the network device may set one downlink BWP in each of the at least one downlink BWP group as the to-be-activated downlink BWP.

Alternatively, a special example of the uplink carrier, namely, an SUL carrier, further exists. In another special example of this implementation, the network device may configure two to-be-activated uplink BWPs for each of at least one uplink BWP group of the D BWP groups, and configure one to-be-activated downlink BWP for each of at least one uplink BWP group of the D BWP groups. Each of the at least one uplink BWP group herein may include both an uplink BWP in an uplink carrier and an uplink BWP in an SUL carrier. For example, the network device configures one downlink carrier, one uplink carrier, and one SUL carrier for the terminal device, the network device configures one or more uplink BWPs in the uplink carrier for the terminal device, configures one or more downlink BWPs in the downlink carrier for the terminal device, and configures one or more uplink SUL BWPs in the SUL carrier for the terminal device. The network device further configures a BWP group for the terminal device, for example, configures one or more uplink BWP groups and one or more downlink BWP groups. Each of some uplink BWP groups may include at least one uplink BWP, each of some uplink BWP groups may include at least one uplink BWP and at least one uplink SUL BWP, and each downlink BWP group includes at least one downlink BWP. For the uplink BWP groups including the uplink SUL BWP, the network device may set an uplink BWP in one uplink carrier in each of the BWP groups as a to-be-activated uplink BWP, and set one uplink SUL BWP in each of the BWP groups as a to-be-activated uplink BWP. In this case, one uplink BWP group includes two to-be-activated uplink BWPs. For at least one of the downlink BWP groups, the network device may further set one downlink BWP in each BWP group as the to-be-activated downlink BWP.

Optionally, a quantity of to-be-activated uplink BWPs configured by the network device for one uplink BWP group is less than or equal to a quantity of uplink BWPs included in the uplink BWP group, and a quantity of to-be-activated downlink BWPs configured by the network device for one downlink BWP group is less than or equal to a quantity of downlink BWPs included in the downlink BWP group. In one uplink BWP group, in addition to at least one to-be-activated uplink BWP, if the uplink BWP group includes another uplink BWP, the another uplink BWP is an uplink BWP in a non-to-be-activated state, or is referred to as a non-to-be-activated uplink BWP. Similarly, in one downlink BWP group, in addition to at least one to-be-activated downlink BWP, if the downlink BWP group further includes another downlink BWP, the another downlink BWP is a downlink BWP in the non-to-be-activated state, or referred to as a non-to-be-activated downlink BWP. The terminal device may be in a radio frequency disabled state for the non-to-be-activated uplink BWP and the non-to-be-activated downlink BWP.

At least one to-be-activated uplink BWP is configured in one uplink BWP group, so that when switching to the uplink BWP group, the terminal device can directly switch to one of the at least one to-be-activated uplink BWP. Similarly, at least one to-be-activated downlink BWP is configured in one downlink BWP group, so that when switching to the downlink BWP group, the terminal device can directly switch to one of the at least one to-be-activated downlink BWP, and may not need to perform excessive BWP selection operations.

After receiving the configuration performed by the network device, the terminal device may determine the D BWP groups. For example, the terminal device may determine information about each of the D BWP groups. The information about the BWP group is, for example, an identifier or an index of the BWP group. The terminal device may further learn of information about all BWPs included in each BWP group, and the information about the BWP includes, for example, an index or an identifier of the BWP. If the network device further configures at least one to-be-activated uplink BWP for each of at least one uplink BWP group of the D BWP groups, after receiving the configuration performed by the network device, the terminal device further determines an index or an identifier of the at least one to-be-activated uplink BWP in each of the at least one uplink BWP group of the D BWP groups. If the network device further configures at least one to-be-activated downlink BWP for each of at least one downlink BWP group of the D BWP groups, after receiving the configuration performed by the network device, the terminal device further determines an index or an identifier of the at least one to-be-activated downlink BWP in each of the at least one downlink BWP group of the D BWP groups.

Optionally, a configuration process of the network device may be performed in an initial random access process of the terminal device. To be specific, the second message (or another configuration message) may be transmitted in the initial random access process of the terminal device. Alternatively, a configuration process of the network device may be performed after an initial random access process of the terminal device is completed. To be specific, the second message (or another configuration message) may be transmitted after the initial random access process of the terminal device is completed. For example, the second message is an RRC message transmitted after the initial random access process of the terminal device is completed. Certainly, the configuration process may alternatively occur in any other time period after the initial random access of the terminal device is completed. This is not specifically limited.

It can be learned from the foregoing descriptions that after receiving the second message, the terminal device may determine N uplink BWPs and M downlink BWPs that are configured by the network device, and the BWPs belong to the D BWP groups. Further, in the D BWP groups, each of at least one uplink BWP group may include at least one to-be-activated uplink BWP; or each of at least one downlink BWP group may include at least one to-be-activated downlink BWP; or each of at least one uplink BWP group may include at least one to-be-activated uplink BWP, and each of at least one downlink BWP group may include at least one to-be-activated downlink BWP.

Optionally, in a special example, the network device may configure one to-be-activated uplink BWP for each of at least one uplink BWP group of the D BWP groups, and configure one to-be-activated downlink BWP for each of at least one downlink BWP group of the D BWP groups. For example, after the terminal device completes the initial random access, the network device configures four uplink BWPs for the terminal device, where the four uplink BWPs are respectively an uplink BWP 0 to an uplink BWP 3; configures four downlink BWPs, where the four downlink BWPs are respectively a downlink BWP 0 to a downlink BWP 3: and configures two uplink BWP groups and two downlink BWP groups for the terminal device, where the two uplink BWP groups are an uplink BWP group 0 and an uplink BWP group 1, the uplink BWP group 0 includes the uplink BWP 0 and the uplink BWP 1, the uplink BWP group 1 includes the uplink BWP 2 and the uplink BWP 3, the two downlink BWP groups are a downlink BWP group 0 and a downlink BWP group 1, the downlink BWP group 0 includes the downlink BWP 0 and the downlink BWP 1, and the downlink BWP group 1 includes the downlink BWP 2 and the downlink BWP 3. The network device further configures the uplink BWP 0 as a to-be-activated uplink BWP in the uplink BWP group 0, the uplink BWP 3 as a to-be-activated uplink BWP in the uplink BWP group 1, the downlink BWP 0 as a to-be-activated downlink BWP in the downlink BWP group 0, and the downlink BWP 3 as a to-be-activated downlink BWP in the downlink BWP group 1. In this case, after receiving the configuration performed by the network device, the terminal device may determine information about the uplink BWP 0 to the uplink BWP 3, the downlink BWP 0 to the downlink BWP 3, the uplink BWP group 0, the uplink BWP group 1, the downlink BWP group 0, and the downlink BWP group 1, and may further set all of the uplink BWP 0, the downlink BWP 0, the uplink BWP 3, and the downlink BWP 3 as to-be-activated BWPs.

Optionally, in another special example, the network device may configure two to-be-activated uplink BWPs for each of at least one uplink BWP group of the D BWP groups, and configure one to-be-activated downlink BWP for each of at least one uplink BWP group of the D BWP groups. Each of the at least one uplink BWP group herein includes both an uplink BWP in an uplink carrier and an uplink BWP in an SUL carrier. For example, after the terminal device completes the initial random access, the network device configures six uplink BWPs for the terminal device, where four BWPs are configured in an uplink carrier and the four BWPs are respectively an uplink BWP 0 to an uplink BWP 3, and two uplink BWPs are configured in an SUL carrier and the two uplink BWPs are respectively an uplink BWP 4 and an uplink BWP 5; configure four downlink BWPs in a downlink carrier, where the four downlink BWPs are respectively a downlink BWP 0 to a downlink BWP 3; and configures two uplink BWP groups and two downlink BWP groups for the terminal device, where the two uplink BWP groups are an uplink BWP group 0 and an uplink BWP group 1, the uplink BWP group 0 includes the uplink BWP 0 and the uplink BWP 1 in the uplink carrier and includes the uplink BWP 4 in the SUL carrier, and the uplink BWP group 1 includes the uplink BWP 2 and the uplink BWP 3 in the uplink carrier and includes the uplink BWP 5 in the SUL carrier; and the two downlink BWP groups are a downlink BWP group 0 and a downlink BWP group 1, the downlink BWP group 0 includes the downlink BWP 0 and the downlink BWP 1 in the downlink carrier, and the downlink BWP group 1 includes the downlink BWP 2 and the downlink BWP 3 in the downlink carrier. The network device further configures the uplink BWP 0 in the uplink carrier and the uplink BWP 4 in the SUL carrier as to-be-activated uplink BWPs in the uplink BWP group 0, the uplink BWP 3 in the uplink carrier and the uplink BWP 5 in the SUL carrier as to-be-activated uplink BWPs in the uplink BWP group 1, the downlink BWP 0 in the downlink carrier as a to-be-activated downlink BWP in the downlink BWP group 0, and the downlink BWP 3 as a to-be-activated downlink BWP in the downlink BWP group 1. In this case, after receiving the configuration performed by the network device, the terminal device may determine information about the uplink BWP 0 to the uplink BWP 3 in the uplink carrier, the uplink BWP 4 and the uplink BWP 5 in the SUL carrier, the downlink BWP 0 to the downlink BWP 3 in the downlink carrier, the uplink BWP group 0, the uplink BWP group 1, the downlink BWP group 0, and the downlink BWP group 1; and may further determine that the uplink BWP 0 in the uplink carrier, the uplink BWP 4 in the SUL carrier, the uplink BWP 3 in the uplink carrier, the uplink BWP 5 in the SUL carrier, and the downlink BWP 0 and the downlink BWP 3 in the downlink carrier are all to-be-activated BWPs.

As described above, after receiving the second message, the terminal device may determine the one or more to-be-activated BWPs of the terminal device based on the second message. As described above, the network device may further configure the D BWP groups for the terminal device. In this case, the terminal device may further determine that each of the one or more to-be-activated BWPs of the terminal device belongs to a corresponding BWP group. For example, one uplink BWP of the one or more to-be-activated BWPs of the terminal device may be a BWP in one uplink BWP group of the terminal device, the second BWP, or another to-be-activated BWP. For example, the uplink BWP group includes $K_5$ uplink BWPs, where $K_5$ is a positive integer. For another example, one downlink BWP in the one or more to-be-activated BWPs of the terminal device may be a BWP in one downlink BWP group of the terminal device, the second BWP, or another to-be-activated BWP. For example, the downlink BWP group includes $K_6$ downlink BWPs, where $K_6$ is a positive integer. The uplink BWP group including the $K_5$ uplink BWPs and the downlink BWP group including the $K_6$ downlink BWPs may both belong to the D BWP groups, or the uplink BWP group including the $K_5$ uplink BWPs and the downlink BWP group including the $K_6$ downlink BWPs may not coexist. For example, the D BWP groups include only the uplink BWP group including the $K_5$ uplink BWPs, and do not include the downlink BWP group including the $K_6$ downlink BWPs; or the D BWP groups include only the downlink BWP group including the $K_6$ downlink BWPs, and do not include the uplink BWP group including the $K_5$ uplink BWPs.

In addition, if the network device further configures at least one to-be-activated uplink BWP group for each of at least one uplink BWP group of the D BWP groups, the terminal device may determine that one of the at least one uplink BWP group of the D BWP groups may include at least one to-be-activated uplink BWP, and the at least one to-be-activated uplink BWP is included in the one or more to-be-activated BWPs of the terminal device. In other words, the at least one to-be-activated uplink BWP belongs to the one or more to-be-activated BWPs of the terminal device. For example, the uplink BWP group includes $K_7$ uplink BWPs, where $K_7$ is a positive integer. If the network device further configures at least one to-be-activated downlink BWP for each of at least one downlink BWP group of the D BWP groups, the terminal device may determine that one of the at least one downlink BWP group of the D BWP groups may include at least one to-be-activated downlink BWP, and the at least one to-be-activated downlink BWP is included in the one or more to-be-activated BWPs of the terminal device. In other words, the at least one to-be-activated downlink BWP belongs to the one or more to-be-activated BWPs of the terminal device. For example, the downlink BWP group includes $K_8$ downlink BWPs, where $K_8$ is a positive integer. The uplink BWP group including the $K_7$ uplink BWPs and the downlink BWP group including the $K_8$ downlink BWPs may both belong to the D BWP groups, or the uplink BWP group including the $K_7$ uplink BWPs and the downlink BWP group including the $K_8$ downlink BWPs may not coexist. For example, the D BWP groups include only the uplink BWP group including the $K_7$ uplink BWPs, and do not include the downlink BWP group including the $K_8$ downlink BWPs; or the D BWP groups include only the downlink BWP group including the $K_8$ downlink BWPs, and do not include the uplink BWP group including the $K_7$ uplink BWPs.

In this embodiment of this application, for example, the network device may indicate, to the terminal device by using the second message or another message, which all or some of the BWP groups configured for the terminal device are in the to-be-activated state. Setting one uplink BWP group to be in the to-be-activated state may be setting all or some of uplink BWPs included in the uplink BWP group to be in the to-be-activated state, and setting one downlink BWP group to be in the to-be-activated state may be setting all or some of downlink BWPs included in the downlink BWP group to be in the to-be-activated state. For example, the network device further configures at least one to-be-activated uplink BWP for each of at least one uplink BWP group of the D BWP groups. In this case, it may be considered that the at least one uplink BWP group is configured by the network device to be in the to-be-activated state. For another example, the network device further configures at least one to-be-activated downlink BWP for each of at least one downlink BWP group of the D BWP groups. In this case, it may be considered that the at least one downlink BWP group is configured by the network device to be in the to-be-activated state. This is also the same for the terminal device. For example, the network device further configures at least one to-be-activated uplink BWP for each of at least one uplink BWP group of the D BWP groups. In this case, the terminal device may determine the at least one to-be-activated uplink BWP in each of the at least one uplink BWP group of the D BWP groups. In other words, the terminal device also determines that the at least one uplink BWP group is in the to-be-activated state. Similarly, for example, if the network device further configures at least one to-be-activated downlink BWP for each of at least one downlink BWP group of the D BWP groups, the terminal device may determine the at least one to-be-activated downlink BWP in each of the at least one downlink BWP group of the D BWP groups. In other words, the terminal device also determines that the at least one downlink BWP group is in the to-be-activated state.

Optionally, if the network device configures one to-be-activated uplink BWP for each of at least one uplink BWP group, the network device may configure at least two uplink BWP groups to be in the to-be-activated state. If the network device configures at least two to-be-activated uplink BWPs for each of at least one uplink BWP group, the network device may set the at least one uplink BWP group to be in the to-be-activated state. In conclusion, it is ensured as much as possible that to-be-activated uplink BWPs of the terminal device are at least two uplink BWPs in the one or more BWPs of the terminal device. Similarly, if the network device configures one to-be-activated downlink BWP for each of at least one downlink BWP group, the network device may set at least two downlink BWP groups to be in the to-be-activated state. If the network device configures at least two to-be-activated downlink BWPs for each of at least one downlink BWP group, the network device may set the at least one downlink BWP group to be in the to-be-activated state. In conclusion, it is ensured as much as possible that to-be-activated downlink BWPs of the terminal device are at least two downlink BWPs in the one or more BWPs of the terminal device.

For example, after configuring the D BWP groups, the network device sets all the D BWP groups to be in the to-be-activated state. In this case, the terminal device further determines, as indicated by the network device, that all the D BWP groups are in the to-be-activated state, and a manner of configuring the D BWP groups to be in the to-be-activated state is: The network device configures one to-be-activated uplink BWP for each uplink BWP group that is in the D BWP groups and that does not include any uplink BWP in an SUL carrier, and the network device configures two to-be-activated uplink BWPs for each uplink BWP group that is in the D BWP groups and that includes an uplink BWP in an SUL carrier. The two to-be-activated uplink BWPs include an uplink BWP that is in the uplink carrier and that is set to be in the to-be-activated state and an uplink BWP that is in the SUL carrier and that is set to be in the to-be-activated state. In an example, the first message sent by the network device may not need to indicate a specific index of the new active BWP, but may indicate information about a BWP group, for example, an identifier or an index of the BWP group. As the terminal device determines the BWP group, the terminal device may directly switch to a to-be-activated uplink BWP in the BWP group by default, without needing to obtain, from the network device by using additional signaling, BWPs to which the terminal device is to switch to one by one, thereby facilitating an operation of the terminal device. If switching is related, S93 may also be understood as that the terminal device switches to the second BWP, and the network device and the terminal device transmit a signal with each other in the second BWP. Therefore, for a corresponding flowchart in the embodiment shown in FIG. 9A, refer to FIG. 9B. After the terminal device switches to the second BWP the second BWP also changes from the to-be-activated state to the active state. In other words, the second BWP changes to an active BWP. Therefore, it may also be considered that the terminal device activates the second BWP.

For example, after the terminal device completes the initial random access, the network device configures four uplink BWPs for the terminal device, where the four uplink BWPs are respectively an uplink BWP 0 to an uplink BWP 3; configures four downlink BWPs, where the four downlink BWPs are respectively a downlink BWP 0 to a downlink BWP 3: and configures two uplink BWP groups and two downlink BWP groups for the terminal device, where the two uplink BWP groups are an uplink BWP group 0 and an uplink BWP group 1, the uplink BWP group 0 includes the uplink BWP 0 and the uplink BWP 1, the uplink BWP group 1 includes the uplink BWP 2 and the uplink BWP 3, the two downlink BWP groups are a downlink BWP group 0 and a downlink BWP group 1, a downlink BWP group 0 includes the downlink BWP 0 and the downlink BWP 1, and the downlink BWP group 1 includes the downlink BWP 2 and the downlink BWP 3. The network device further configures the uplink BWP 0 as a to-be-activated uplink BWP in the uplink BWP group 0, the uplink BWP 3 as a to-be-activated uplink BWP in the uplink BWP group 1, the downlink BWP 0 as a to-be-activated downlink BWP in the downlink BWP group 0, and the downlink BWP 3 as a to-be-activated downlink BWP in the downlink BWP group 1. For example, the terminal device initially works in the uplink BWP group 0, to be specific, works in the uplink BWP 0. In this case, the network device sends the first message to the terminal device, and a manner of the first message for indicating the new active BWP is, for example, indicating information about a BWP group. For example, the first message indicates an index of the uplink BWP group 1. In this case, the terminal device determines that a target BWP to which the terminal device is to switch is located in the uplink BWP group 1, and the terminal device switches to the uplink BWP 3 in the uplink BWP group 1 by default, without needing to determine an index of the BWP again.

In a special example, the network device configures one downlink carrier, one uplink carrier, and one SUL carrier for the terminal device, and the network device configures one or more uplink BWPs for the terminal device in the uplink carrier, configures one or more uplink BWPs for the terminal device in the SUL carrier, and configures one or more downlink BWPs for the terminal device in the downlink carrier. The network device further configures a BWP group for the terminal device. For example, each of some or all of uplink BWP groups may include the one or more uplink BWPs in the uplink carrier and the one or more uplink BWPs in the SUL carrier. For such an uplink BWP group, the network device may set one of the one or more uplink BWPs in the uplink carrier as the to-be-activated uplink BWP, and set one of the one or more uplink BWPs in the SUL carriers as the to-be-activated uplink BWP. That is, the two to-be-activated uplink BWPs in the uplink BWP group are respectively the uplink BWP in the uplink carrier and the uplink BWP in the SUL carrier. For such an uplink BWP group, when instructing the terminal device to switch an uplink BWP, the network device may further indicate an identifier of a carrier. For example, the network device may indicate, by using the first message, an identifier of the BWP group and an identifier of a carrier in which a target to-be-activated uplink BWP to which the terminal device is to switch is located, to indicate an uplink carrier in which the target uplink BWP to which the terminal device is to switch is located, to distinguish between the uplink BWP in the uplink carrier and the uplink BWP in the SUL carrier.

For example, after configuring the D BWP groups, the network device sets all or some of the D BWP groups to be in the to-be-activated state. In this case, during communication with the terminal device, the network device may keep the BWP groups in the to-be-activated state all the time. Certainly, the network device may alternatively instruct the terminal device to keep the BWP groups in the to-be-activated state all the time. That the BWP group remains in the to-be-activated state may mean that at least one BWP in the BWP group remains in the to-be-activated state.

Optionally, if the network device sets some of the BWP groups to be in the to-be-activated state after configuring the BWP groups, the network device may further update, in a communication process, the BWP group that is set to be in the to-be-activated state, and the network device may instruct, by using a message, the terminal device to update the BWP group that is set to be in the to-be-activated state. The message is, for example, an RRC message, a MAC CE, or DCI. The updating may include: setting, to be in the to-be-activated state, a BWP group that is not previously set to be in the to-be-activated state, and/or setting, to be in the non-to-be-activated state, the BWP group that is previously set to be in the to-be-activated state. For the non-to-be-activated state, refer to the explanation in the first grouping manner.

The second grouping manner described above is applicable to a symmetric spectrum system and an asymmetric spectrum system. For the asymmetric spectrum system, an uplink BWP group and a downlink BWP group that have a same BWP group index may be configured as a BWP group pair. To be specific, indexes may be separately added for the uplink BWP group and the downlink BWP group. For example, an index of an uplink BWP group may range from 1 to n, and an index of a downlink BWP group may range from 1 to m, where m and n may be equal to or may not be equal to each other. In this case, an uplink BWP group and a downlink BWP group that have a same index exist, so that the uplink BWP group and the downlink BWP group that have the same index may be configured as a BWP group pair. For example, if a downlink BWP of the terminal device is switched from a downlink BWP group 1 to a downlink BWP group 2, a corresponding uplink BWP of the terminal device further needs to be switched to a to-be-activated uplink BWP in an uplink BWP group 2 that is paired with the downlink BWP group 2. For the symmetric spectrum system, an uplink BWP group and a downlink BWP group may be independently activated and to be activated. For example, a downlink BWP of the terminal device is switched from a downlink BWP in a BWP group 1 to a downlink BWP in a BWP group 2, and an uplink BWP of the terminal device may be switched or may not be switched, and whether the uplink BWP of the terminal device needs to be switched is determined by the network device. If the uplink BWP of the terminal device also needs to be switched, the network device may further indicate, in the first message, a target uplink BWP to which the terminal device is to switch or a target uplink BWP group to which the terminal device is to switch.

Optionally, for both an asymmetric spectrum system and a symmetric spectrum system, an uplink BWP group and a downlink BWP group of the terminal device may be selected for pairing. After a downlink BWP of the terminal device is switched from the downlink BWP group 1 to the downlink BWP group 2, an uplink BWP of the terminal device also needs to be switched to the to-be-activated uplink BWP in the uplink BWP group 2 paired with the downlink BWP group 2.

The foregoing describes the two grouping manners in which the network device groups the one or more BWPs configured for the terminal device. In this embodiment, the network device may alternatively not group the one or more BWPs configured for the terminal device. In this case, the network device configures the N uplink BWPs and the M downlink BWPs for the terminal device, and the network device may set at least two uplink BWPs thereof as to-be-activated BWPs, or set at least two downlink BWPs thereof as to-be-activated BWPs, or set at least two uplink BWPs thereof as to-be-activated BWPs and set at least two downlink BWPs thereof as to-be-activated BWPs. For example, the network device may notify, by using the second message, the terminal device of the N uplink BWPs and the M downlink BWPs, information about the at least two to-be-activated uplink BWPs, and/or information about the at least two to-be-activated downlink BWPs; or the network device may notify the terminal device of the N uplink BWPs and the M downlink BWPs by using another message. After receiving the configuration performed by the network device, the terminal device determines that the at least two to-be-activated uplink BWPs and/or the at least two to-be-activated downlink BWPs are in the to-be-activated state.

Optionally, regardless of whether the network device uses a grouping manner or does not use a grouping manner, after configuring a to-be-activated BWP, the network device may further update the to-be-activated BWP. For example, the network device may update a to-be-activated BWP configured previously in a process of communicating with the terminal device. The updating herein may include: reconfiguring a previously configured to-be-activated BWP as a non-to-be-activated BWP, and/or reconfiguring a previously configured non-to-be-activated BWP as a to-be-activated BWP. If the network device determines to update the to-be-activated BWP, the network device may send a message, for example, an RRC message, a MAC CE, or DCI, to the terminal device to indicate the to-be-activated BWP to be updated. In this case, the terminal device may also perform resetting based on the new configuration performed by the network device.

For ease of understanding the update described in the foregoing paragraph, a relationship between a to-be-activated BWP group and a to-be-activated BWP is briefly explained herein:

1. The network device configures a BWP group for the terminal device, and configures a to-be-activated BWP for the BWP group. If one BWP group includes a to-be-activated BWP, the BWP group is a to-be-activated BWP group.

After configuring a to-be-activated BWP in one BWP group, the network device may further update the to-be-activated BWP in the BWP group. For example, the network device changes the to-be-activated BWP in the BWP group from a BWP 1 to a BWP 2. In this case, the network device may indicate the update of the to-be-activated BWP to the terminal device by using an RRC message.

2. For example, the network device configures a first to-be-activated BWP for each BWP group. The first to-be-activated BWP is a BWP to which the terminal device directly switches when the terminal device switches to the BWP group. In addition, the network device configures a to-be-activated BWP group. If one BWP group is configured to be in the to-be-activated state, the first to-be-activated BWP in the BWP group is included in one or more to-be-activated BWPs included in the BWP group. In other words, the network device configures the BWP group to be in the to-be-activated state, to configure the first to-be-activated BWP configured in the BWP group to be in the to-be-activated state.

After configuring one BWP group to be in the to-be-activated state, the network device may further update the BWP group configured to be in the to-be-activated state. For example, if the network device changes the BWP group configured to be in the to-be-activated state from a BWP group 1 to a BWP group 2, the network device may indicate the update of the to-be-activated BWP group to the terminal device by using an RRC message.

In this embodiment of this application, to make configuration performed by the network device more adaptable to an actual status of the terminal device, the terminal device may further send a capability message to the network device, and the network device receives the capability message from the terminal device. The capability message may carry capability information of the terminal device, so that the network device may configure a BWP for the terminal device based on the capability information of the terminal device. For example, a process in which the terminal device sends the capability message and the network device receives the capability message may occur before the process, described above, in which the network device configures the BWP for the terminal device. The capability message sent by the terminal device may indicate a quantity of active BWPs that can be supported by the terminal device, and/or a quantity of to-be-activated BWPs that can be supported by the terminal device. To be specific, the capability message may indicate a quantity of active BWPs that can be supported by the terminal device, or indicate a quantity of to-be-activated BWPs that can be supported by the terminal device; or indicate a quantity of active BWPs that can be supported by the terminal device and a quantity of to-be-activated BWPs that can be supported by the terminal device. That the capability message indicates a quantity of active BWPs that can be supported by the terminal device may be understood as that the capability information included in the capability message indicates the quantity of active BWPs that can be supported by the terminal device. Similarly, that the capability message indicates a quantity of to-be-activated BWPs that can be supported by the terminal device may also be understood as that the capability information included in the capability message indicates the quantity of to-be-activated BWPs that can be supported by the terminal device. In this case, if the capability message needs to indicate the quantity of active BWPs that can be supported by the terminal device and indicate the quantity of to-be-activated BWPs that can be supported by the terminal device, that is, the capability information to be sent by the terminal device needs to indicate the quantity of active BWPs that can be supported by the terminal device and indicate the quantity of to-be-activated BWPs that can be supported by the terminal device, it may be understood that the terminal device needs to send two parts of capability information, one part of the capability information indicates the quantity of active BWPs that can be supported by the terminal device, and the other part of the capability information indicates the quantity of to-be-activated BWPs that can be supported by the terminal device. In this embodiment, the terminal device may send the two parts of capability information by using one capability message. To be specific, one capability message may indicate the quantity of active BWPs that can be supported by the terminal device and the quantity of to-be-activated BWPs that can be supported by the terminal device. Alternatively, the terminal device may separately send the two parts of capability information by using two capability messages. To be specific, one capability message may indicate the quantity of active BWPs that can be supported by the terminal device, and the other capability message may indicate the quantity of to-be-activated BWPs that can be supported by the terminal device.

Optionally, after the network device receives the capability message, if the capability message is used to indicate the quantity of active BWPs that can be supported by the terminal device, the network device may determine, based on the capability message, the quantity of active BWPs that can be supported by the terminal device; or if the capability message is used to indicate the quantity of to-be-activated BWPs that can be supported by the terminal device, the network device may determine, based on the capability message, the quantity of to-be-activated BWPs that can be supported by the terminal device; or if the capability message is used to indicate the quantity of active BWPs that can be supported by the terminal device and the quantity of to-be-activated BWPs that can be supported by the terminal device, the network device may determine, based on the capability message of the terminal device, the quantity of active BWPs that can be supported by the terminal device and the quantity of to-be-activated BWPs that can be supported by the terminal device.

For example, the terminal device may send the capability information of the terminal device by using one or more of a message 1 (msg1), a message 3 (msg3), an RRC message, or some other uplink messages in the random access process. It may also be understood that the terminal device may send the capability information of the terminal device by using one message. For example, the terminal device sends one piece of capability information, and the capability information is applicable to an uplink and a downlink. Alternatively, the terminal device may send the capability information of the terminal device by using a plurality of messages. For example, the terminal device may separately send uplink capability information and downlink capability information of the terminal device by using different messages. The message 1 may be a preamble sequence sent by the terminal device to the network device in the initial random access process of the terminal device. The message 3 may be a third message that is sent to the network device and that is used by the terminal device to determine that a random access response of the network device is sent to the terminal device rather than another terminal device in the initial random access process of the terminal device.

The quantity of active BWPs that can be supported by the terminal device is a maximum quantity of BWPs in which the terminal device can simultaneously transmit a signal or simultaneously communicate with the network device. The quantity of to-be-activated BWPs that can be supported by the terminal device is a maximum quantity of BWPs that can be simultaneously kept in the to-be-activated state by the terminal device. The terminal device is in the radio frequency enabled state for the BWPs in the to-be-activated state. When the terminal device switches from an active BWP to a to-be-activated BWP, it may be considered that a switching latency is very low, and even the switching latency may be considered as an approximately zero latency. However, when the terminal device switches from an active BWP to a non-to-be-activated BWP, a switching latency that can be measured, that is relatively high, or that cannot be ignored is required.

For example, the capability message sent by the terminal device may indicate that the terminal device can support three to-be-activated uplink BWPs and two to-be-activated downlink BWPs, so that the network device can separately determine an uplink capability and a downlink capability of the terminal device. Alternatively, the capability message sent by the terminal device may indicate that the terminal device can support two to-be-activated BWPs. This indicates that the terminal device supports both two to-be-activated uplink BWPs and two to-be-activated downlink BWPs.

Similarly, for example, the capability message sent by the terminal device may indicate that the terminal device can support three active uplink BWPs and two active downlink BWPs, so that the network device can separately determine an uplink capability and a downlink capability of the terminal device. Alternatively, the capability message sent by the terminal device may indicate that the terminal device can support two active BWPs. This indicates that the terminal device can support both two active uplink BWPs and two active downlink BWPs.

For example, if the terminal device can support simultaneous communication with the network device in only one BWP, even if a plurality of to-be-activated BWPs are simultaneously set for the terminal device, data can be transmitted in only one of the BWPs at a moment (during the data transmission, the BWP is an active BWP, and is no longer the to-be-activated BWP). Different to-be-activated BWPs may communicate with each other in a time domain multiplexed manner. Alternatively, if the terminal device can support simultaneous communication with the network device in a plurality of BWPs, the terminal device may perform frequency division multiplexed communication in a plurality of to-be-activated BWPs.

Optionally, if the network device uses a manner of grouping BWPs configured for the terminal device, after receiving the capability message sent by the terminal device, the network device may group the N uplink BWPs and the M downlink BWPs that are configured for the terminal device; or the network device may directly configure one or more BWP groups for the terminal device. As described above, all the BWP groups configured for the terminal device may be simultaneously activated. Therefore, a quantity of configured BWP groups may be less than or equal to a quantity of to-be-activated BWPs that can be supported by the terminal device, avoid a case in which a quantity of BWPs simultaneously in the to-be-activated state exceeds a capability of the terminal device. If a quantity of to-be-activated uplink BWPs supported by the terminal device is different from a quantity of to-be-activated downlink BWP supported by the terminal device, the quantity of configured BWP groups may be less than or equal to a smaller value in the quantity of to-be-activated uplink BWPs supported by the terminal device and the quantity of to-be-activated downlink BWPs supported by the terminal device. For example, if the terminal device supports two to-be-activated BWPs, the quantity of BWP groups configured by the network device for the terminal device may be less than or equal to 2, and may be specifically 1 or 2.

In addition, a possible implementation of the first message is further described. In this implementation, an example in which the first message is implemented by using DC is used. The DCI may be a downlink control indication scrambled by using a specific radio network temporary identifier of the terminal device. Further, this implementation is applicable to a manner in which the network device groups BWPs configured for the terminal device. This implementation is applicable to the first grouping manner described above, and may further be applicable to the second grouping manner described above.

In this embodiment of this application, for example, the DCI may include one bit field. For example, the bit field is referred to as a BWP indicator field, and the BWP indicator field may be used to indicate the new active BWP. For example, it is predefined that the terminal device initially works in a to-be-activated uplink BWP and a to-be-activated downlink BWP in a BWP group having a lowest group number. If the network device needs the terminal device to switch to another BWP, the network device may instruct, by using the DCI, the terminal device to switch the BWP. A length of the BWP indicator field may be determined based on a quantity of BWPs included in one BWP group of the terminal device and a total quantity of BWP groups of the terminal device. The BWP group used to determine the length of the BWP indicator field may be a BWP group in which a quantity of BWPs is greater than or equal to a quantity of BWPs included in another BWP group of the terminal device. A quantity of BWPs included in one BWP group may be a quantity of uplink BWPs included in the BWP group. In this case, the BWP group used to determine the length of the BWP indicator field may be a BWP group in which a quantity of uplink BWPs is greater than or equal to a quantity of uplink BWPs included in another BWP group of the terminal device. Alternatively, a quantity of BWPs included in one BWP group may be a quantity of downlink BWPs included in the BWP group. In this case, the BWP group used to determine the length of the BWP indicator field may be a BWP group in which a quantity of downlink BWPs is greater than or equal to a quantity of downlink BWPs included in another BWP group of the terminal device. Alternatively, a quantity of BWPs included in one BWP group may be a total quantity of uplink BWPs and downlink BWPs included in the BWP group. In this case, the BWP group used to determine the length of the BWP indicator field may be a BWP group in which a total quantity of uplink BWPs and downlink BWPs is greater than or equal to a total quantity of uplink BWPs and downlink BWPs included in another BWP group of the terminal device.

For example, a quantity of BWPs included in one BWP group is a quantity of uplink BWPs included in the BWP group. The terminal device has a total of three BWP groups, which are respectively a BWP group 0 to a BWP group 2. The BWP group 0 includes two uplink BWPs, the BWP group 1 includes four uplink BWPs, and the BWP group 2 includes two uplink BWPs. In this case, the length of the BWP indicator field may be determined based on the quantity of uplink BWPs included in the BWP group 1 and the total quantity of BWP groups of the terminal device, that is, a length of an uplink BWP indicator field is determined based on the values 4 and 3.

An implementation of determining a length of a BWP indicator field based on a quantity of BWPs included in one BWP group of the terminal device and a total quantity of BWP groups of the terminal device is as follows:

Length of the BWP indicator field in the DCI=$\lceil \log_2 (n_{BWP}+n_{group}-1) \rceil$     (Formula 1)

where $\lceil \ \rceil$ represents rounding up; $n_{BWP}$ is a quantity of uplink BWPs or downlink BWPs included in one BWP group, and may be a maximum value of quantities of uplink BWPs or a maximum value of quantities of downlink BWPs in all BWP groups, or may be a predefined value; or $n_{BWP}$ is a total quantity of uplink BWPs and downlink BWPs included in one BWP group, or may be a maximum value of quantities of uplink BWPs and downlink BWPs in all BWP groups; and $n_{group}$ is a total quantity of BWP groups configured by the network device for the terminal device, a length of an uplink BWP indicator field in uplink DCI may be determined based on the quantity of uplink BWPs in the BWP group, and a length of a downlink BWP indicator field in downlink DCI may be determined based on the quantity of downlink BWPs in the BWP group.

The first grouping manner described above is used as an example. For example, after the terminal device completes the initial random access, the network device configures four uplink BWPs for the terminal device, where the four uplink BWPs are an uplink BWP 0 to an uplink BWP 3; configures four downlink BWPs, where the four downlink BWPs are a downlink BWP 0 to a downlink BWP 3; and configures two BWP groups for the terminal device, where a BWP group 0 includes the uplink BWP 0, the uplink BWP 1, the downlink BWP 0, and the downlink BWP 1, and a BWP group 1 includes the uplink BWP 2, the uplink BWP 3, the downlink BWP 2, and the downlink BWP 3. The network device further configures the uplink BWP 0 as a to-be-activated uplink BWP in the BWP group 0, the downlink BWP 0 as a to-be-activated downlink BWP in the BWP group 0, the uplink BWP 3 as a to-be-activated uplink BWP in the BWP group 1, and the downlink BWP 3 as a to-be-activated downlink BWP in the BWP group 1. In this case, the length of the BWP indicator field included in the DCI used as the first message is 2. Assuming that the terminal device initially works in the downlink BWP 0, the network device instructs, by using the DCI, the terminal device to switch the BWP. Different content may be indicated by using different values of the BWP indicator field included in the DCI. For example, if the value of the BWP indicator field is 00, it indicates that the BWP is not switched, and the DCI may be DCI used for scheduling. If the value of the BWP indicator field is 01, it indicates that the BWP is switched to the downlink BWP 1 in the BWP group 0, and it may be considered that the value 01 of the BWP indicator field indicates an index or an identifier of the BWP group 0, or indicates an index or an identifier of the downlink BWP 1. If the value of the BWP indicator field is 10, it indicates that the BWP is switched to the downlink BWP 2 in the BWP group 1. If the value of the BWP indicator field is 11, 11 are reserved bits. As described above, after a to-be-activated BWP in one BWP group is configured, the to-be-activated BWP in the group may further be updated. For example, for the BWP group 1, the to-be-activated BWP may be changed from the downlink BWP 2 to the downlink BWP 3. In this case, when switching from the BWP group 0 to the BWP group 1, the terminal device directly switches to the downlink BWP 3.

In this embodiment of this application, after switching to the second BWP, the terminal device may communicate with the network device in the second BWP. In addition, in this embodiment of this application, after switching to the second BWP, the terminal device may further keep the first BWP in the to-be-activated state. To be specific, when a signal is transmitted in the second BWP, the first BWP may further be included in the one or more to-be-activated BWPs of the terminal device. In this way, if the terminal device needs to switch back to the first BWP again next time, switching with an approximately zero latency may further be implemented.

Actually, in this embodiment, the target active BWP may be a to-be-activated BWP, or may be a non-to-be-activated BWP. Further, if the target active BWP is a to-be-activated BWP after switching to the target active BWP, the terminal device may further keep the first BWP in the to-be-activated state. If the target active BWP is a non-to-be-activated BWP, after switching to the target active BWP, the terminal device may set the first BWP to be in the non-to-be-activated state, that is, deactivate the first BWP. Because the target active BWP is a non-to-be-activated BWP, if the terminal device still keeps the first BWP in the to-be-activated state after switching to the target active BWP, a quantity of BWPs simultaneously in the to-be-activated state may be greater than the quantity of to-be-activated BWPs that can be supported by the terminal device. Therefore, if the target active BWP is a non-to-be-activated BWP, after switching to the target active BWP, the terminal device may deactivate the first BWP, so that the terminal device always works based on a normal capability of the terminal device, and a probability that the terminal device is faulty is reduced as much as possible.

In the foregoing embodiments provided in this application, the methods provided in the embodiments of this application are separately described from perspectives of the network device, the terminal device, and interaction between the network device and the terminal device. To implement functions in the foregoing methods provided in the embodiments of this application, the network device and the terminal device may include a hardware structure and/or a software module, and implement the foregoing functions in a form of the hardware structure, the software module, or a combination of the hardware structure and the software module. Whether a specific function of the foregoing functions is performed by using the hardware structure, the software module, or the combination of the hardware structure and the software module depends on a particular application and a design constraint of the technical solution.

Figure 11:
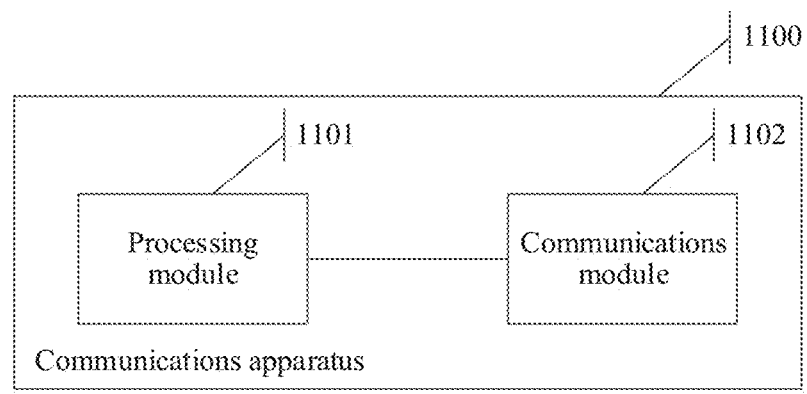
FIG. 11 is a schematic structural diagram of a communications apparatus that can implement a function of a network device according to an embodiment of this application.

FIG. 11 is a schematic structural diagram of a communications apparatus 1100. The communications apparatus 1100 may be a terminal device, and can implement a function of the terminal device in the method provided in the embodiments of this application. The communications apparatus 1100 may alternatively be an apparatus that can support a terminal device in implementing a function of the terminal device in the method provided in the embodiments of this application. The communications apparatus 1100 may be a hardware structure, a software module, or a combination of a hardware structure and a software module. The communications apparatus 1100 may alternatively be implemented by using a chip system. In the embodiments of this application, the chip system may include a chip, or may include a chip and another discrete component.

The communications apparatus 1100 includes a processing module 1101 and a communications module 1102.

The communications module 1102 may be configured to perform S91 and S93 in the embodiment shown in FIG. 9A or FIG. 9B, and/or configured to support another process of the technology described in this specification. The communications module 1102 is used by the communications apparatus 1100 to communicate with another module, which may be a circuit, a component, an interface, a bus, a software module, a transceiver, or any other apparatus that is capable of implementing communication.

The processing module 1101 is configured to perform S92 in the embodiment shown in FIG. 9A, and may further be configured to perform a step other than information sending and receiving in the embodiment shown in FIG. 9A or FIG. 9B, and/or configured to support another process of the technology described in this specification. All related content of the steps in the foregoing method embodiment may be cited in functional descriptions of the corresponding function modules. Details are not described herein again.

Figure 12:
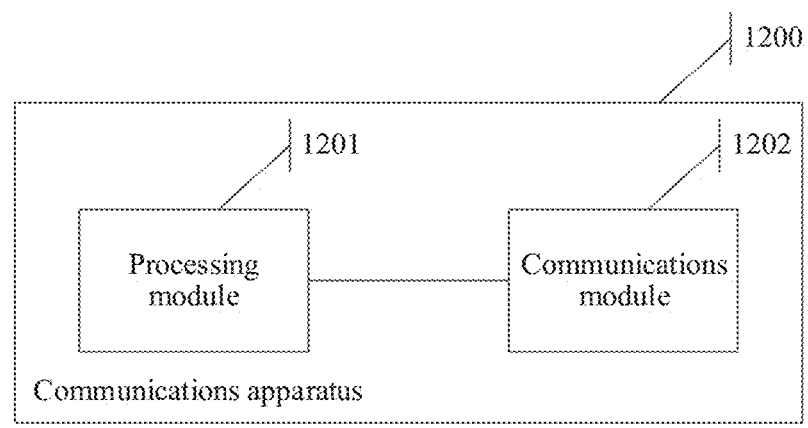
FIG. 12 is a schematic structural diagram of a communications apparatus that can implement a function of a terminal device according to an embodiment of this application.

FIG. 12 is a schematic structural diagram of a communications apparatus 1200. The communications apparatus 1200 may be a network device, and can implement a function of the network device in the method provided in the embodiments of this application. The communications apparatus 1200 may alternatively be an apparatus that can support a network device in implementing a function of the network device in the method provided in the embodiments of this application. The communications apparatus 1200 may be a hardware structure, a software module, or a combination of a hardware structure and a software module. The communications apparatus 1200 may alternatively be implemented by using a chip system.

The communications apparatus 1200 may include a processing module 1201 and a communications module 1202.

The processing module 1201 may be configured to perform at least one of the steps of determining BWPs to be configured for the terminal device, determining BWP groups to be configured for the terminal device, and determining to-be-activated BWPs to be configured for the terminal device in the embodiment shown in FIG. 9A or FIG. 9B, and may further be configured to perform a step other than information sending and receiving in the embodiment shown in FIG. 9A or FIG. 9B, and/or configured to support another process of the technology described in this specification.

The communications module 1202 is configured to perform S91 and S93 in the embodiment shown in FIG. 9A or FIG. 9B, and/or configured to support another process of the technology described in this specification. The communications module 1202 is used by the communications apparatus 1200 to communicate with another module, which may be a circuit, a component, an interface, a bus, a software module, a transceiver, or any other apparatus that is capable of implementing communication.

All related content of the steps in the foregoing method embodiment may be cited in functional descriptions of the corresponding function modules. Details are not described herein again.

Division into modules in the embodiments of this application is an example, is merely logical function division, and may be other division in an actual implementation. In addition, function modules in the embodiments of this application may be integrated into one processor, or each of the modules may exist alone physically, or two or more modules may be integrated into one module. The integrated module may be implemented in a form of hardware, or may be implemented in a form of a software function module.

Figure 13:
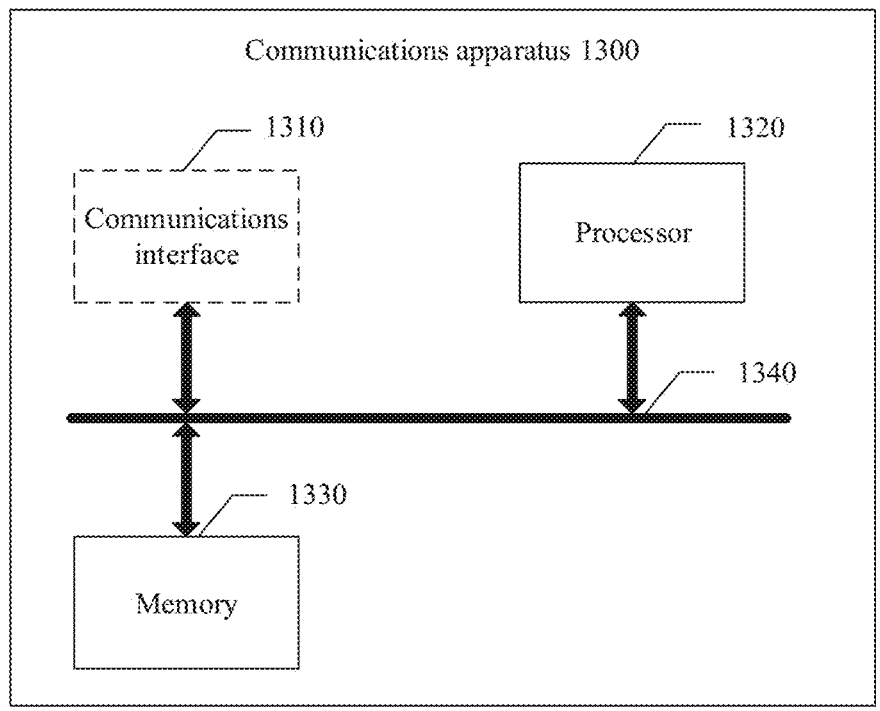
FIG. 13 is a schematic structural diagram of another communications apparatus that can implement a function of a network device according to an embodiment of this application.

FIG. 13 shows a communications apparatus 1300 according to an embodiment of this application. The communications apparatus 1300 may be a terminal device, and can implement a function of the terminal device in the method provided in the embodiments of this application. The communications apparatus 1300 may alternatively be an apparatus that can support a terminal device in implementing a function of the terminal device in the method provided in the embodiments of this application. The communications apparatus 1300 may be a chip system.

The communications apparatus 1300 includes at least one processor 1320, configured to implement the function of the terminal device in the method provided in the embodiments of this application or support the communications apparatus 1300 in implementing the function of the terminal device in the method provided in the embodiments of this application. The processor 1320 may be configured to perform S92 in the embodiment shown in FIG. 9A. For example, the processor 1320 may determine a configuration performed by a network device. For example, the processor 1320 may determine a BWP configured by the network device for the terminal device, may further determine a BWP group configured by the network device for the terminal device, and may further determine a to-be-activated BWP configured by the network device for the terminal device. For details, refer to the detailed descriptions in the method example. Details are not described herein again.

The communications apparatus 1300 may further include at least one memory 1330, configured to store a program instruction and/or data. The memory 1330 is coupled to the processor 1320. The coupling in the embodiments of this application is an indirect coupling or a communication connection between apparatuses, units, or modules, may be in an electrical form, a mechanical form, or another form, and is used for information exchange between the apparatuses, the units, and the modules. The processor 1320 may operate in collaboration with the memory 1330. The processor 1320 may execute the program instruction stored in the memory 1330. At least one memory 1330 in the at least one memory 1330 may be included in the processor 1320.

The communications apparatus 1300 may further include a communications interface 1310, configured to communicate with another device through a transmission medium, so that an apparatus used in the communications apparatus 1300 can communicate with the another device. For example, the communications interface 1310 is, for example, a transceiver, and is understood as, for example, a radio frequency transceiver component in the communications apparatus 1300, or is understood as an interface of a radio frequency transceiver component in the communications apparatus 1300. For example, the another device may be a network device. The processor 1320 may send and receive data through the communications interface 1310, and may implement the method performed by the terminal device in the embodiment corresponding to FIG. 9A or FIG. 9B.

In this embodiment of this application, a specific connection medium between the communications interface 1310, the processor 1320, and the memory 1330 is not limited. In this embodiment of this application, in FIG. 13, the memory 1330, the processor 1320, and the communications interface 1310 are connected through a bus 1340. The bus is represented by a bold line in FIG. 13. A connection manner between other components is merely an example for description, and is not limited thereto. The bus may be classified into an address bus, a data bus, a control bus, and the like. For ease of representation, only one thick line is used to represent the bus in FIG. 13, but this does not mean that there is only one bus or only one type of bus.

In the embodiments of this application, the processor may be a general purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general purpose processor may be a microprocessor or any conventional processor or the like. The steps of the method disclosed with reference to the embodiments of this application may be directly performed by a hardware processor, or may be performed by using a combination of hardware in the processor and a software module.

In the embodiments of this application, the memory may be a nonvolatile memory, such as a hard disk drive (HDD) or a solid-state drive (SSD), or may be a volatile memory, such as a random access memory (RAM). The memory is any other medium that can be configured to carry or store expected program code in a form of an instruction or a data structure and that can be accessed by a computer. However, the memory is not limited thereto. The memory in the embodiments of this application may alternatively be a circuit or any other apparatus that can implement a storage function, and is configured to store the program instruction and/or the data.

Figure 14:
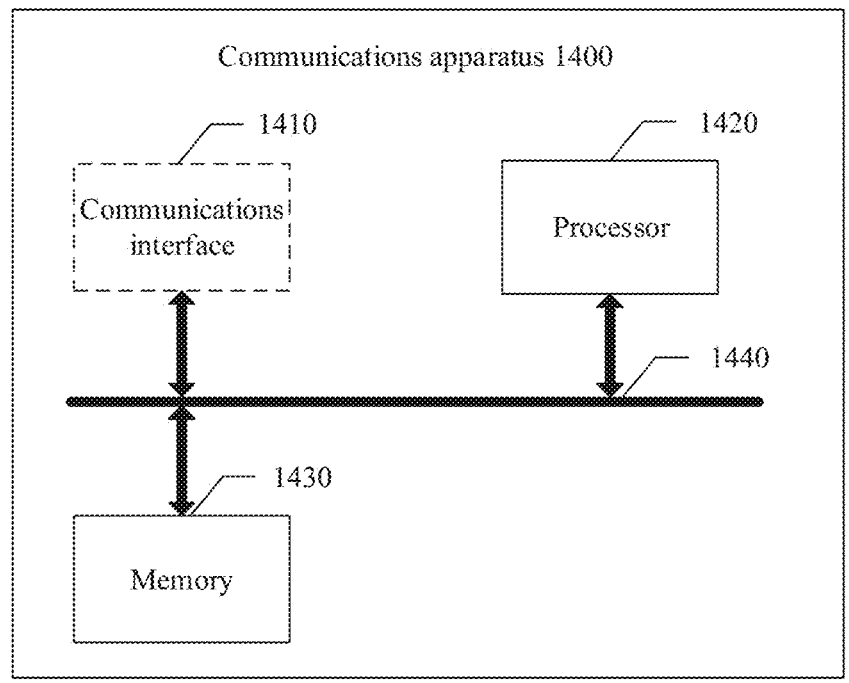
FIG. 14 is a schematic structural diagram of another communications apparatus that can implement a function of a terminal device according to an embodiment of this application.

FIG. 14 shows a communications apparatus 1400 according to an embodiment of this application. The communications apparatus 1400 may be a network device, and can implement a function of the network device in the method provided in the embodiments of this application. The communications apparatus 1400 may alternatively be an apparatus that can support a network device in implementing a function of the network device in the method provided in the embodiments of this application. The communications apparatus 1400 may be a chip system.

The communications apparatus 1400 includes at least one processor 1420, configured to implement the function of the network device in the method provided in the embodiments of this application or support the apparatus in implementing the function of the network device in the method provided in the embodiments of this application. For example, the processor 1420 may determine a configuration for a terminal device. For example, the processor 1420 is configured to determine BWPs to be configured for the terminal device, may further determine BWP groups to be configured for the terminal device, may further determine to-be-activated BWPs to be configured for the terminal device, and may further determine whether the terminal device needs to switch a BWP. For details, refer to the detailed descriptions in the method example. Details are not described herein again.

The communications apparatus 1400 may further include at least one memory 1430, configured to store a program instruction and/or data. The memory 1430 is coupled to the processor 1420. The coupling in the embodiments of this application is an indirect coupling or a communication connection between apparatuses, units, or modules, may be in an electrical form, a mechanical form, or another form, and is used for information exchange between the apparatuses, the units, and the modules. The processor 1420 may operate in collaboration with the memory 1430. The processor 1420 may execute the program instruction stored in the memory 1430. At least one memory 1430 in the at least one memory 1430 may be included in the processor 1420.

The communications apparatus 1400 may further include a communications interface 1410, configured to communicate with another device through a transmission medium, so that an apparatus used in the communications apparatus 1400 can communicate with the another device. For example, the communications interface 1410 is, for example, a transceiver, and is understood as, for example, a radio frequency transceiver component in the communications apparatus 1400, or is understood as an interface of a radio frequency transceiver component in the communications apparatus 1400. For example, the another device may be a terminal device. The processor 1420 may send and receive data through the communications interface 1410, and may implement the method performed by the terminal device in the embodiment corresponding to FIG. 9A or FIG. 9B.

A specific connection medium between the communications interface 1410, the processor 1420, and the memory 1430 is not limited in this embodiment of this application. In this embodiment of this application, in FIG. 14, the memory 1430, the processor 1420, and the communications interface 1410 are connected through a bus 1440. The bus is represented by a bold line in FIG. 14. A connection manner between other components is merely an example for description, and is not limited thereto. The bus may be classified into an address bus, a data bus, a control bus, and the like. For ease of representation, only one thick line is used to represent the bus in FIG. 14, but this does not mean that there is only one bus or only one type of bus.

An embodiment of this application further provides a computer-readable storage medium, including an instruction. When the instruction is run on a computer, the computer is enabled to perform the method performed by the network device in the embodiments of this application.

An embodiment of this application further provides a computer-readable storage medium, including an instruction. When the instruction is run on a computer, the computer is enabled to perform the method performed by the terminal device in the embodiments of this application.

An embodiment of this application provides a chip system. The chip system includes a processor, may further include a memory, and is configured to implement a function of the network device in the foregoing method. The chip system may include a chip, or may include a chip and another discrete component.

An embodiment of this application provides a chip system. The chip system includes a processor, may further include a memory, and is configured to implement a function of the terminal device in the foregoing method. The chip system may include a chip, or may include a chip and another discrete component.

An embodiment of this application provides a communications system. The communications system includes the foregoing network device and the foregoing terminal device.

All or some of the foregoing methods in the embodiments of this application may be implemented by using software, hardware, firmware, or any combination thereof. When software is used to implement the embodiments, all or some of the embodiments may be implemented in a form of computer program product. The computer program product includes one or more computer instructions. When the computer program instructions are loaded and executed on a computer, all or some of the procedures or functions according to the embodiments of the present invention are generated. The computer may be a general purpose computer, a special purpose computer, a computer network, a network device, a user device, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

It is clear that a person skilled in the art can make various modifications and variations to this application without departing from the scope of this application. This application is intended to cover the modifications and variations of this application provided that they fall within the scope of the claims of this application and their equivalent technologies.

What is claimed is:

1. A signal transmission method, comprising:
receiving a first message in an active first bandwidth part (BWP);
determining, based on a BWP indicator field in the first message, that a new active BWP of a terminal device is a second BWP, wherein a length of the BWP indicator field is determined based on a quantity of BWPs comprised in one BWP group of the terminal device and a quantity of BWP groups of the terminal device, wherein the quantity of BWPs comprised in the BWP group of the terminal device is greater than or equal to a quantity of BWPs comprised in another BWP group of the terminal device, and wherein the second BWP is a BWP in one or more to-be-activated BWPs of the terminal device, and the terminal device is in a radio frequency enabled state for the one or more to-be-activated BWPs of the terminal device; and
transmitting a signal in the second BWP.

2. The method according to claim 1, wherein the method further comprises:
receiving a second message, and determining the one or more to-be-activated BWPs of the terminal device based on the second message, wherein the one or more to-be-activated BWPs of the terminal device are at least one of at least two downlink BWPs or at least two uplink BWPs in BWPs of the terminal device.

3. The method according to claim 1, wherein
one of the one or more to-be-activated BWPs of the terminal device is a BWP in one BWP group of the terminal device, and the BWP group comprises $K_1$ uplink BWPs and $K_2$ downlink BWPs, wherein both $K_1$ and $K_2$ are positive integers.

4. The method according to claim 1, wherein
one BWP group of the terminal device comprises at least one to-be-activated uplink BWP and at least one to-be-activated downlink BWP, wherein the at least one to-be-activated uplink BWP and the at least one to-be-activated downlink BWP are comprised in the one or more to-be-activated BWPs of the terminal device, and the BWP group comprises $K_3$ uplink BWPs and $K_4$ downlink BWPs, and wherein both $K_3$ and $K_4$ are positive integers.

5. The method according to claim 1, wherein at least one of:
one uplink BWP in the one or more to-be-activated BWPs of the terminal device is a BWP in one uplink BWP group of the terminal device, and the uplink BWP group comprises $K_5$ uplink BWPs, wherein $K_5$ is a positive integer; or
one downlink BWP in the one or more to-be-activated BWPs of the terminal device is a BWP in one downlink BWP group of the terminal device, and the downlink BWP group comprises $K_6$ downlink BWPs, wherein $K_6$ is a positive integer.

6. The method according to claim 1, wherein at least one of:
one uplink BWP group of the terminal device comprises at least one to-be-activated uplink BWP, the at least one to-be-activated uplink BWP is comprised in the one or more to-be-activated BWPs of the terminal device, and the uplink BWP group comprises $K_7$ uplink BWPs, wherein $K_7$ is a positive integer; or
one downlink BWP group of the terminal device comprises at least one to-be-activated downlink BWP, the at least one to-be-activated downlink BWP is comprised in the one or more to-be-activated BWPs of the terminal device, and the downlink BWP group comprises $K_8$ downlink BWPs, wherein $K_8$ is a positive integer.

7. The method according to claim 1, wherein the method further comprises:
sending a capability message, wherein the capability message is used to indicate at least of one of the following:
a quantity of active BWPs that can be supported by the terminal device; or
a quantity of to-be-activated BWPs that can be supported by the terminal device.

8. The method according to claim 1, wherein when the signal is transmitted in the second BWP, the first BWP is comprised in the one or more to-be-activated BWPs of the terminal device.

9. A signal transmission method, comprising:
sending a first message in an active first bandwidth part (BWP), wherein the first message, based on a BWP indicator field in the first message, indicates that a new active BWP of a terminal device is a second BWP, wherein a length of the BWP indicator field is determined based on a quantity of BWPs comprised in one BWP group of the terminal device and a quantity of BWP groups of the terminal device, wherein the quantity of BWPs comprised in the BWP group of the terminal device is greater than or equal to a quantity of BWPs comprised in another BWP group of the terminal device, and wherein the second BWP is a BWP in one or more to-be-activated BWPs of the terminal device, and the terminal device is in a radio frequency enabled state for the one or more to-be-activated BWPs of the terminal device; and
transmitting a signal in the second BWP.

10. The method according to claim 9, wherein the method further comprises:
sending a second message, wherein the second message is used to indicate the one or more to-be-activated BWPs of the terminal device, and the one or more to-be-activated BWPs of the terminal device are at least one of at least two downlink BWPs or at least two uplink BWPs in BWPs of the terminal device.

11. The method according to claim 9, wherein
one of the one or more to-be-activated BWPs of the terminal device is a BWP in one BWP group of the terminal device, and the BWP group comprises $K_1$ uplink BWPs and $K_2$ downlink BWPs, wherein both $K_1$ and $K_2$ are positive integers.

12. The method according to claim 9, wherein the method further comprises:
one BWP group of the terminal device comprises at least one to-be-activated uplink BWP and at least one to-be-activated downlink BWP, wherein the at least one to-be-activated uplink BWP and the at least one to-be-activated downlink BWP are comprised in the one or more to-be-activated BWPs of the terminal device, and the BWP group comprises $K_3$ uplink BWPs and $K_4$ downlink BWPs, and wherein both $K_3$ and $K_4$ are positive integers.

13. The method according to claim 9, wherein at least one of:
one uplink BWP in the one or more to-be-activated BWPs of the terminal device is a BWP in one uplink BWP group of the terminal device, and the uplink BWP group comprises $K_5$ uplink BWPs, wherein $K_5$ is a positive integer; or
one downlink BWP in the one or more to-be-activated BWPs of the terminal device is a BWP in one downlink BWP group of the terminal device, and the downlink BWP group comprises $K_6$ downlink BWPs, wherein $K_6$ is a positive integer.

14. The method according to claim 9, wherein at least one of:
one uplink BWP group of the terminal device comprises at least one to-be-activated uplink BWP, the at least one to-be-activated uplink BWP is comprised in the one or more to-be-activated BWPs of the terminal device, and the uplink BWP group comprises $K_7$ uplink BWPs, wherein $K_7$ is a positive integer; or
one downlink BWP group of the terminal device comprises at least one to-be-activated downlink BWP, the at least one to-be-activated downlink BWP is comprised in the one or more to-be-activated BWPs of the terminal device, and the downlink BWP group comprises $K_8$ downlink BWPs, wherein $K_8$ is a positive integer.

15. A communications apparatus, comprising:
at least one processor and at least one communications interface, wherein
the at least one processor is configured to receive a first message in an active first bandwidth part (BWP) through the communications interface;
the at least one processor is configured to determine, based on a BWP indicator field in the first message, that a new active BWP of a terminal device is a second BWP, wherein a length of the BWP indicator field is determined based on a quantity of BWPs comprised in one BWP group of the terminal device and a quantity of BWP groups of the terminal device, wherein the quantity of BWPs comprised in the BWP group of the terminal device is greater than or equal to a quantity of BWPs comprised in another BWP group of the terminal device, and wherein the second BWP is a BWP in one or more to-be-activated BWPs of the terminal device, and the terminal device is in a radio frequency enabled state for the one or more to-be-activated BWPs of the terminal device; and
the at least one processor is further configured to transmit a signal in the second BWP through the at least one communications interface.

16. The communications apparatus according to claim 15, wherein
the at least one processor is further configured to receive a second message through the at least one communications interface, and the at least one processor is further configured to determine the one or more to-be-activated BWPs of the terminal device based on the second message, wherein the one or more to-be-activated BWPs of the terminal device are at least one of at least two downlink BWPs or at least two uplink BWPs in BWPs of the terminal device.

17. The communications apparatus according to claim 15, wherein
one of the one or more to-be-activated BWPs of the terminal device is a BWP in one BWP group of the terminal device, and the BWP group comprises $K_1$ uplink BWPs and $K_2$ downlink BWPs, wherein both $K_1$ and $K_2$ are positive integers.

18. The communications apparatus according to claim 15, wherein
one BWP group of the terminal device comprises at least one to-be-activated uplink BWP and at least one to-be-activated downlink BWP, the at least one to-be-activated uplink BWP and the at least one to-be-activated downlink BWP are comprised in the one or more to-be-activated BWPs of the terminal device, and the BWP group comprises $K_3$ uplink BWPs and $K_4$ downlink BWPs, wherein both $K_3$ and $K_4$ are positive integers.

19. The communications apparatus according to claim 15, wherein at least one of:
one uplink BWP in the one or more to-be-activated BWPs of the terminal device is a BWP in one uplink BWP group of the terminal device, and the uplink BWP group comprises $K_5$ uplink BWPs, wherein $K_5$ is a positive integer; or
one downlink BWP in the one or more to-be-activated BWPs of the terminal device is a BWP in one downlink BWP group of the terminal device, and the downlink BWP group comprises $K_6$ downlink BWPs, wherein $K_6$ is a positive integer.

* * * * *